(12) United States Patent
Tokura et al.

(10) Patent No.: US 10,748,699 B2
(45) Date of Patent: Aug. 18, 2020

(54) COIL DEVICE

(71) Applicant: IHI CORPORATION, Tokyo (JP)

(72) Inventors: Susumu Tokura, Tokyo (JP); Akio Ueda, Tokyo (JP); Jun Araki, Tokyo (JP)

(73) Assignee: IHI CORPORATION, Tokyo (JP)

( * ) Notice: Subject to any disclaimer, the term of this patent is extended or adjusted under 35 U.S.C. 154(b) by 940 days.

(21) Appl. No.: 15/358,838

(22) Filed: Nov. 22, 2016

(65) Prior Publication Data
US 2017/0076854 A1 Mar. 16, 2017

Related U.S. Application Data

(63) Continuation of application No. PCT/JP2015/061155, filed on Apr. 9, 2015.

(30) Foreign Application Priority Data

May 22, 2014 (JP) .................. 2014-105906

(51) Int. Cl.
| | | |
|---|---|---|
| H01F 27/30 | (2006.01) |
| H01F 27/28 | (2006.01) |
| H02J 50/12 | (2016.01) |
| H02J 50/70 | (2016.01) |
| H01F 27/36 | (2006.01) |

(Continued)

(52) U.S. Cl.
CPC .......... *H01F 27/2823* (2013.01); *B60L 53/12* (2019.02); *H01F 27/02* (2013.01); *H01F 27/306* (2013.01); *H01F 27/325* (2013.01); *H01F 27/36* (2013.01); *H01F 38/14* (2013.01); *H02J 7/025* (2013.01); *H02J 50/10* (2016.02); *H02J 50/12* (2016.02); *H02J 50/70* (2016.02); *B60L 5/005* (2013.01); *H01F 27/362* (2013.01); *H02J 7/0042* (2013.01); *Y02T 10/7005* (2013.01); *Y02T 10/7072* (2013.01); *Y02T 90/122* (2013.01); *Y02T 90/14* (2013.01)

(58) Field of Classification Search
CPC ...... H01F 27/02; H01F 27/2823; H01F 27/24; H01F 27/325; H01F 27/303; H01F 38/14
USPC .................................. 336/200, 232
See application file for complete search history.

(56) References Cited

U.S. PATENT DOCUMENTS

2003/0210106 A1 11/2003 Cheng et al.
2005/0116683 A1 6/2005 Cheng et al.
(Continued)

FOREIGN PATENT DOCUMENTS

CN 102348574 A 2/2012
CN 102629782 A 8/2012
(Continued)

*Primary Examiner* — Tszfung J Chan
(74) *Attorney, Agent, or Firm* — Volpe and Koenig, P.C.

(57) ABSTRACT

A coil device of solenoid type includes a coil portion having a bobbin and a conductive wire wound around the bobbin, a housing for accommodating the coil portion, and at least one fastener for fastening the bobbin and the housing. The conductive wire includes a plurality of extending portions extending along a wound wire direction on the bobbin and having gaps in a winding axis direction, and the coil portion includes an enlarged portion in which a gap between extending portions adjacent to each other in the winding axis direction is wider than a gap between other extending portions. The fastener is provided in the enlarged portion.

12 Claims, 16 Drawing Sheets

(51) Int. Cl.
  *H01F 38/14*  (2006.01)
  *H02J 7/02*   (2016.01)
  *H02J 50/10*  (2016.01)
  *B60L 53/12*  (2019.01)
  *H01F 27/02*  (2006.01)
  *H01F 27/32*  (2006.01)
  *B60L 5/00*   (2006.01)
  *H02J 7/00*   (2006.01)

(56) References Cited

U.S. PATENT DOCUMENTS

| | | |
|---|---|---|
| 2005/0135122 A1 | 6/2005 | Cheng et al. |
| 2005/0140482 A1 | 6/2005 | Cheng et al. |
| 2006/0061323 A1 | 3/2006 | Cheng et al. |
| 2006/0076922 A1 | 4/2006 | Cheng et al. |
| 2008/0129246 A1 | 6/2008 | Morita et al. |
| 2009/0096414 A1 | 4/2009 | Cheng et al. |
| 2009/0189565 A1 | 7/2009 | Cheng et al. |
| 2010/0219791 A1 | 9/2010 | Cheng et al. |
| 2010/0320963 A1 | 12/2010 | Cheng et al. |
| 2011/0102124 A1 | 5/2011 | Matsushita |
| 2011/0259694 A1 | 10/2011 | Matsumura |
| 2012/0194125 A1 | 8/2012 | Kanasugi et al. |
| 2012/0242447 A1 | 9/2012 | Ichikawa |
| 2013/0181797 A1* | 7/2013 | Hickox .............. B60L 53/12 336/61 |
| 2014/0084697 A1* | 3/2014 | Yasuda .............. H02J 50/70 307/104 |
| 2014/0167903 A1 | 6/2014 | Tomonari et al. |
| 2015/0102684 A1 | 4/2015 | Tanaka et al. |
| 2015/0130288 A1 | 5/2015 | Ichikawa |
| 2015/0137590 A1* | 5/2015 | Ichikawa ............ H02J 5/005 307/9.1 |
| 2017/0221626 A1 | 8/2017 | Tomonari et al. |

FOREIGN PATENT DOCUMENTS

| | | |
|---|---|---|
| CN | 102656648 A | 9/2012 |
| CN | 106920627 A | 7/2017 |
| CN | 106935360 A | 7/2017 |
| EP | 2618344 A1 | 7/2013 |
| JP | 2004-153902 A | 5/2004 |
| JP | 2004-259794 A | 9/2004 |
| JP | 2004259794 A * | 9/2004 |
| JP | 2005-079428 A | 3/2005 |
| JP | 2005-525705 A | 8/2005 |
| JP | 2008-117847 A | 5/2008 |
| JP | 2008-120239 A | 5/2008 |
| JP | 2008-182075 A | 8/2008 |
| JP | 2010-087353 A | 4/2010 |
| JP | 2012-151311 A | 8/2012 |
| JP | 2013-153025 A | 8/2013 |
| JP | 2013-153132 A | 8/2013 |
| JP | 2013153025 A * | 8/2013 |
| JP | 2014-039369 A | 2/2014 |
| JP | 2014-068834 A | 4/2014 |
| WO | 2013/132921 A1 | 9/2013 |
| WO | 2013/168239 A1 | 11/2013 |
| WO | 2013/183105 A1 | 12/2013 |
| WO | 2013/183106 A1 | 12/2013 |

* cited by examiner

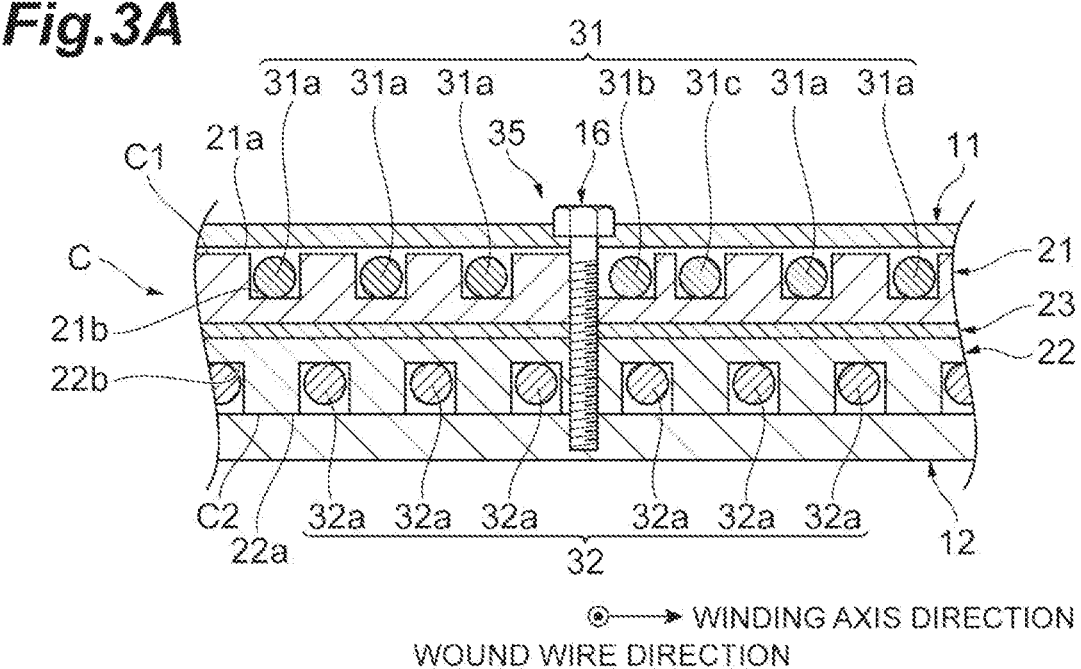
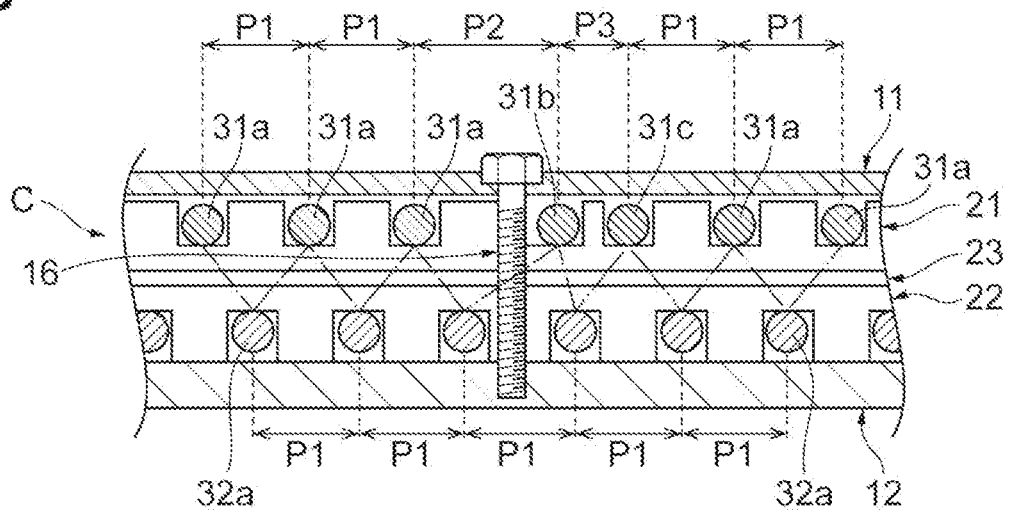

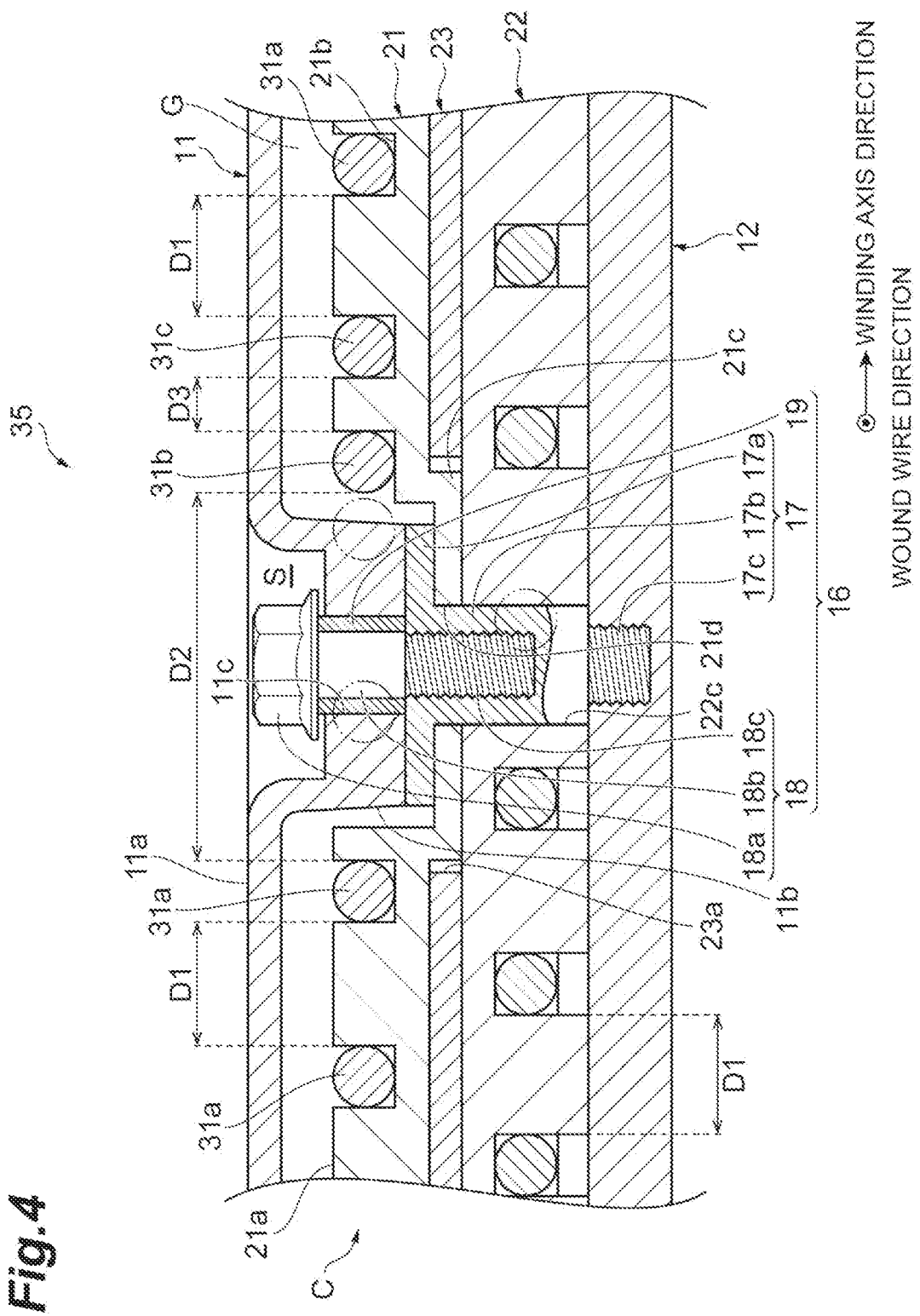

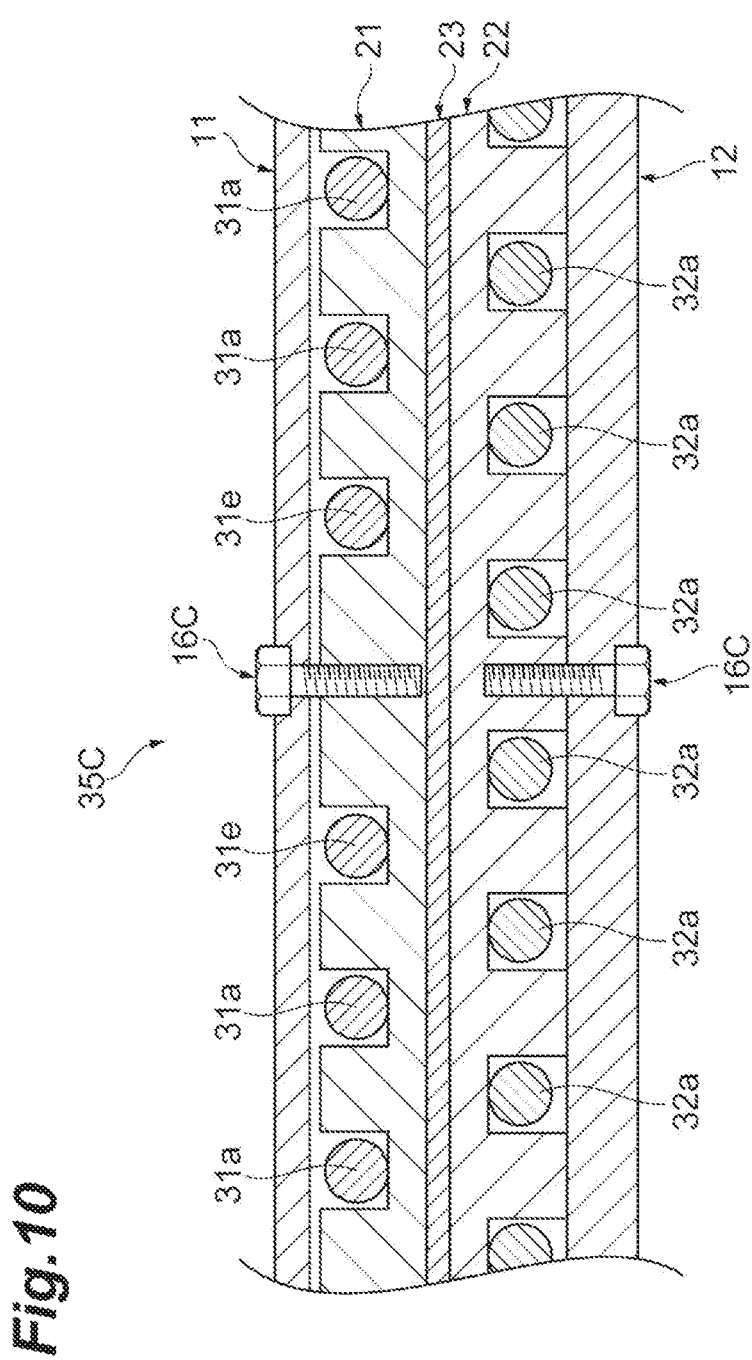

COIL DEVICE

CROSS-REFERENCE TO RELATED APPLICATIONS

This application is a continuation application of International Application No. PCT/JP/2015/061155, filed Apr. 9, 2015, which claims priority to Japanese Patent Application No. 2014-105906, filed on May 22, 2014. The contents of these applications are incorporated herein by reference in their entirety.

TECHNICAL FIELD

The present disclosure relates to a coil device.

BACKGROUND ART

A wireless power transfer system includes a power transmission coil device and a power reception coil device, and implements wireless power transmission using electromagnetic induction, magnetic resonance, etc. between coils. Each of the coil devices has a coil and ferrite therein. The coil device is surrounded by a housing. For example, the housing includes a protective cover and an aluminum plate. For example, the wireless power transfer system is applied to a power feeding system of an electric vehicle. In this case, the power reception coil device is installed in the vehicle.

Technologies disclosed in Patent Literatures 1, 2, and 3 are known. In an apparatus disclosed in Patent Literature 1, an in-vehicle transducer corresponding to a power reception coil device is installed in a vehicle (chassis). Alternatively, the in-vehicle transducer is installed to protrude downward on a lower surface of a vehicle body. In an apparatus disclosed in Patent Literature 2, a bobbin that supports a secondary self-resonant coil corresponding to a power reception coil is attached to a vehicle by a fixing member connected to a flange portion thereof.

In an apparatus disclosed in Patent Literature 3, an aluminum substrate of a power reception unit is fixed to a lower portion of a moving body by a non-magnetic bolt through a bolt hole. An aluminum substrate of a power feeding unit is fixed to a road surface, etc. by a non-magnetic bolt through a bolt hole. A protective cover made of polycarbonate is fixed to the substrate by a non-magnetic bolt through a bolt hole. A spacer is provided between the protective cover and an insulating plate, and strength of the protective cover is increased by the spacer.

CITATION LIST

Patent Literature

Patent Literature 1: Japanese Unexamined Patent Publication No. 2013-153132
Patent Literature 2: Japanese Unexamined Patent Publication No. 2010-87353
Patent Literature 3: Japanese Unexamined Patent Publication No. 2008-120239

SUMMARY

Technical Problem

In a solenoid coil disclosed in Patent Literature 1, a bobbin around which a conductive wire is wound (a ferrite housing portion in the apparatus of Patent Literature 1) is disposed to extend in a flat plate shape between a protective cover and an aluminum plate. A plurality of slot-shaped grooves is formed in the bobbin, and the conductive wire is disposed in the grooves. In this configuration, the conductive wire wound around the bobbin has a plurality of parallel linear portions on each of a surface side and a rear surface side of the bobbin. Therefore, the conductive wire is present over the entire area of the bobbin disposed between the protective cover and the aluminum plate.

A spacer disclosed in Patent Literature 3 is known to be provided to increase strength of a housing. However, there is difficulty in applying the spacer to a solenoid coil in which a conductive wire is present over the entire are of a bobbin. Increasing strength of the housing is an issue in a coil device that employs the solenoid coil.

An object of the present disclosure is to provide a coil device of solenoid type capable of increasing strength of a housing.

Solution to Problem

A coil device of solenoid type according to an aspect of the present disclosure includes a coil portion having a bobbin and a conductive wire wound around the bobbin, a housing for accommodating the coil portion, and at least one fastener for fastening the bobbin and the housing, wherein the conductive wire includes a plurality of extending portions extending along a wound wire direction on the bobbin and having gaps in a winding axis direction, the coil portion includes an enlarged portion in which a gap between extending portions adjacent to each other in the winding axis direction is wider than a gap between other extending portions, and the fastener is provided in the enlarged portion.

According to this coil device, the housing is accommodated in the coil portion that includes the bobbin. The plurality of extending portions extending in the wound wire direction on the bobbin has gaps in the winding axis direction. The enlarged portion in which the gap between the extending portions adjacent to each other is wider than the gap between other extending portions is provided in the coil portion. The at least one fastener is provided in the enlarged portion. The bobbin and the housing are fastened by the fastener. The gap between the extending portions is wide in the enlarged portion, and thus interference in the extending portion by the fastener is avoided. Therefore, strength of the housing may be increased in the coil device of solenoid type.

In some embodiments, the coil portion further includes a magnetic member disposed inside the bobbin. In this case, power efficiency is increased.

In some embodiments, the housing includes a first housing member facing a first surface of the coil portion having a flat plate shape, and a second housing member fixed to the first housing member to face a second surface on an opposite side from the first surface. In this case, strength of the housing may be increased by fastening the bobbin and at least one of the first housing member and the second housing member by the fastener.

In some embodiments, the bobbin includes a first winding plate disposed between the first housing member and the magnetic member, and a second winding plate disposed between the second housing member and the magnetic member, and the fastener penetrates through the magnetic member and fastens the first winding plate and the second winding plate. In this case, the magnetic member is provided between the first housing member and the second housing member. The fastener penetrates through the magnetic member, and the first winding plate and the second winding plate are fastened, and thus the housing is more strongly fixed to the bobbin.

In some embodiments, a hole portion is provided in the magnetic member, the first winding plate has a protrusion protruding to an inside of the hole portion, and the fastener includes a flange portion contacting the protrusion of the first winding plate from a side of the first housing member, a shaft portion formed on a distal end side of the flange portion to penetrate through the first winding plate, the magnetic member, and the second winding plate, and a distal end portion formed on a distal end side of the shaft portion and screwed to the second housing member. In this case, the protrusion of the first winding plate is pressed against the second winding plate and the second housing member by the fastener. The first winding plate and the second winding plate are more strongly fastened. The magnetic member is sandwiched between and held by the first winding plate and the second winding plate. The magnetic member may be fragile. However, according to the above configuration, strength of the magnetic member may be increased.

In some embodiments, the fastener includes a first screw member in which the flange portion, the shaft portion, and the distal end portion are integrally formed, and a second screw member penetrating through the first housing member to be screwed to the shaft portion. In this case, first, the protrusion of the first winding plate is pressed against the second winding plate and the second housing member by the first screw member. The first housing member is fastened to the first winding plate, the second winding plate, and the second housing member, which are integrated with one another, by the second screw member. In this way, the fastener may be reliably and easily provided by performing fastening in two discrete steps.

In some embodiments, the fastener penetrates through the housing. Fastening using the fastener is performed from the outside of the housing, and thus the fastener may be reliably and easily provided.

In some embodiments, the fastener includes a first combined member integrally provided in the first housing member to protrude toward the second housing member, and a second combined member integrally provided in the second housing member to protrude toward the first housing member, and at least one of the first combined member and the second combined member is disposed inside the coil portion, and the first combined member and the second combined member are combined together. In this case, the fastener does not penetrate through the housing, and thus a seal around the fastener is not needed.

In some embodiments, the conductive wire of the coil portion includes a first extending portion and a second extending portion extending to both sides of the fastener in the winding axis direction to form the enlarged portion, a distance between the fastener and the second extending portion is smaller than a distance between the fastener and the first extending portion, and a gap between the second extending portion and a third extending portion adjacent to the second extending portion in the winding axis direction is narrower than a gap between other extending portions. According to this configuration, the fastener is positioned nearer to the second extending portion between the first extending portion and the second extending portion. The gap between the second extending portion and the third extending portion is narrower than the gap between the other extending portions. Thus, a gap between extending portions (that is, a position of the conductive wire) may not be changed in a portion other than the enlarged portion in which the fastener is provided. Therefore, an influence on a magnetic field may be made as small as possible.

In some embodiments, the fastener is provided in a central region of the bobbin in the wound wire direction and the winding axis direction. In this case, strength of the housing is increased at a position corresponding to the central region of the bobbin. The housing is relatively easily bent at the position corresponding to the central region of the bobbin. Therefore, strength of the housing is further improved.

In some embodiments, the fastener is provided in a central region of the housing in the wound wire direction and the winding axis direction. In this case, strength of the housing is increased at a position corresponding to the central region of the housing. The housing is relatively easily bent in the central region. Therefore, strength of the housing is further improved.

In some embodiments, the fastener is provided in a region in which a decrease in power efficiency due to provision of the fastener is less than or equal to 0.1%. In this case, an influence on power efficiency by the fastener may be made as small as possible.

In some embodiments, the fastener is provided in a region in which a magnetic flux density in the coil portion is lower than a magnetic flux density in another region. In this case, an influence on a magnetic flux by the fastener may be made as small as possible.

In some embodiments, the at least one fastener includes a plurality of fasteners, and the plurality of fasteners are arranged along the winding axis direction.

In some embodiments, the at least one fastener includes a plurality of fasteners, and the plurality of fasteners are arranged along the wound wire direction.

Effects

According to some embodiments of the present disclosure, strength of a housing may be increased in a coil device of solenoid type.

BRIEF DESCRIPTION OF DRAWINGS

FIG. 3A is a cross-sectional view schematically illustrating a portion in which a fastener is provided, and FIG. 3B is a diagram describing a positional relationship of a conductive wire of FIG. 3A.

FIG. 4 is a cross-sectional view illustrating a portion around the fastener of FIG. 2.

FIG. 10 is a cross-sectional view schematically illustrating a portion in which a fastener is provided in another embodiment.

DESCRIPTION OF EMBODIMENTS

Figure 1:
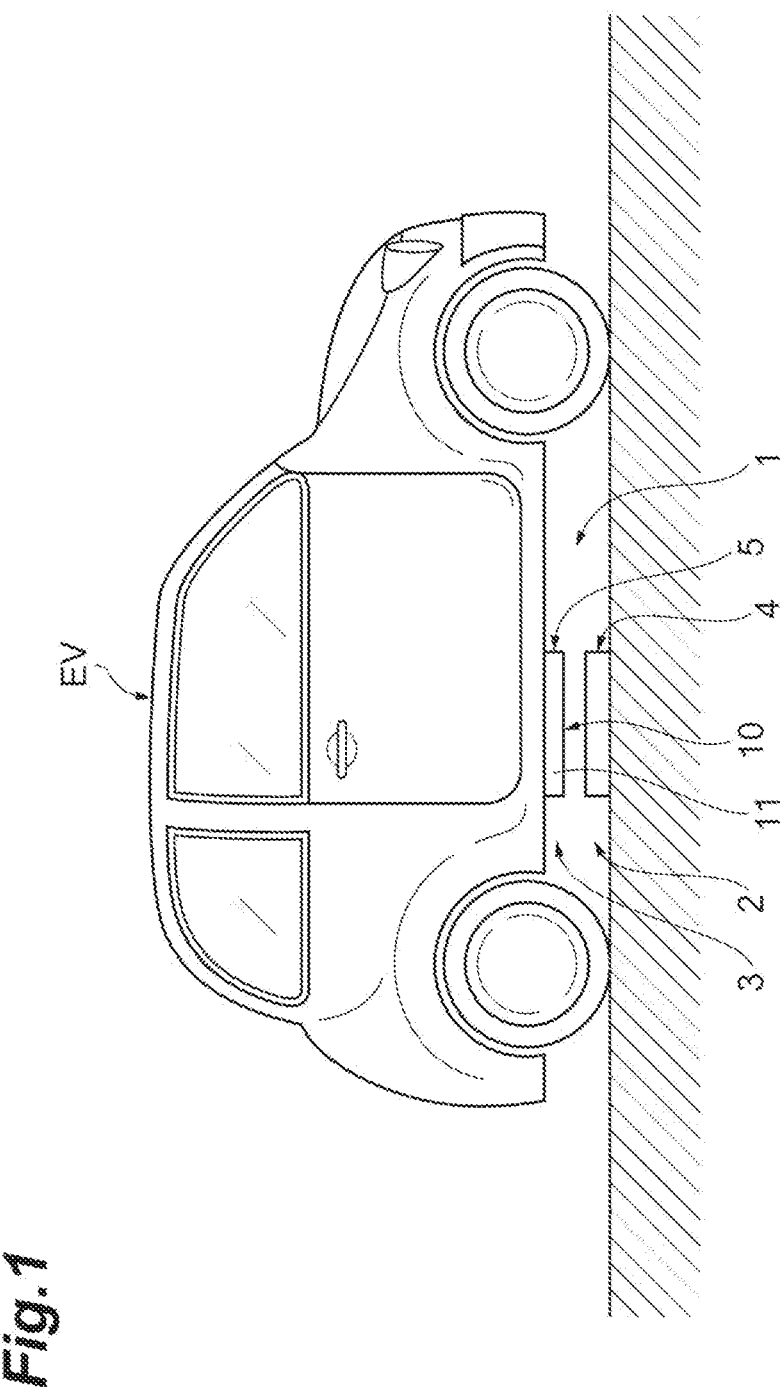
FIG. 1 is a diagram illustrating an application example of a coil device according to an embodiment of the present disclosure.

Hereinafter, embodiments of the present disclosure will be described with reference to drawings. The same reference numeral will be applied to the same component in description of the drawings, and repeated description will be omitted.

A wireless power transfer system 1 to which a coil device of the present embodiment is applied will be described with reference to FIG. 1. The wireless power transfer system 1 is a system for feeding power from a power transmitter 2 to a power receiver 3. For example, the power transmitter 2 and the power receiver 3 are separated from each other in a vertical direction. For example, the power transmitter 2 is installed in a parking lot, etc. For example, the power receiver 3 is installed in an electric vehicle EV. The wireless power transfer system 1 is configured to feed power to the EV arriving at the parking lot, etc. using a magnetic resonance scheme, an electromagnetic induction scheme, etc.

The power transmitter 2 includes a power transmission coil device 4 for wireless power transfer provided to protrude upward from a road surface of the parking lot, etc. For example, the power transmission coil device 4 has a shape of a flat rectangular parallelepiped or frustum. The power transmitter 2 generates desired AC power from a DC power source or an AC power source to send the generated AC power to the power receiver 3, and further includes a controller, an inverter, etc. (not illustrated). For example, the power receiver 3 includes a power reception coil device 5 for wireless power transfer attached to a bottom surface of a vehicle body (chassis, etc.) of an EV to face the power transmission coil device 4. For example, the power reception coil device 5 has a shape of a flat rectangular parallelepiped or frustum. The power receiver 3 receives power from the power transmitter 2 to feed power to a load (e.g., a battery), and further includes a controller, a rectifier, etc. (not illustrated). Hereinafter, the power transmission coil device 4 and the power reception coil device 5 will be referred to as a coil device 4 and a coil device 5, respectively.

The coil device 5 will be described with reference to FIG. 1 and FIG. 2. The coil device 5 generates an induced current when a magnetic flux generated by the power transmission coil device 4 interlinks with the coil device 5. The coil device 5 corresponds to a solenoid type. The coil device 5 includes a flat plate-shaped coil portion C that generates an induced current and a housing 10 that accommodates the coil portion C.

For example, the housing 10, which has a shape of a flat rectangular parallelepiped, includes a base (second housing member) 12 and a protective cover (first housing member) 11 that forms an accommodation space between the protective cover 11 and the base 12 (see FIG. 3A and FIG. 3B). The protective cover 11 faces a surface (first surface) C1 of the coil portion C. The base 12 faces a rear surface (second surface on the opposite side from the first surface) C2 of the coil portion C. When the coil device 5 is installed in the EV, for example, the base 12 is fixed to the vehicle body side. The protective cover 11 faces the coil device 4. That is, the base 12 is disposed above the coil portion C, and the protective cover 11 is disposed below the coil portion C while the coil device 5 is installed in the EV. For example, the base 12 and the protective cover 11 are made of resin. Alternatively, the base 12, which does not face the coil device 4, may be formed using a non-magnetic or conductive material (e.g., aluminum).

The base 12 is a portion fixed to the vehicle body of the EV. For example, the base 12 is fixed to the vehicle body by four screw members 15 at four corner portions. The base 12, which has a rectangular shape, includes a rectangular-shaped accommodating depression 12a slightly smaller than an external form thereof. The coil portion C is accommodated in the accommodating depression 12a, and is fixed to the base 12 by a screw member such as a screw. An insulation sheet may be inserted between the coil portion C and the base 12.

For example, the protective cover 11, which has a rectangular shape, is fixed to the base 12 by four screw members 14 through four screw holes 13 at edges of the base 12. A gap G (see FIG. 4) is formed between the protective cover 11 and the coil portion C substantially over the entire region of the surface C1 of the coil portion C. A fastener 16 described below is provided at a center of the protective cover 11. A seat 11b and a through-hole 11c for providing the fastener 16 are formed in the protective cover 11. The protective cover 11 protrudes to the coil portion C side in a portion in which the through-hole 11c is formed. The above-described gap G extends between the protective cover 11 and the coil portion C in a region excluding the portion in which the through-hole 11c is formed. The protective cover 11 may be flat over the entire region rather than protruding to the coil portion C side in the portion in which the through-hole 11c is formed.

Figure 2:
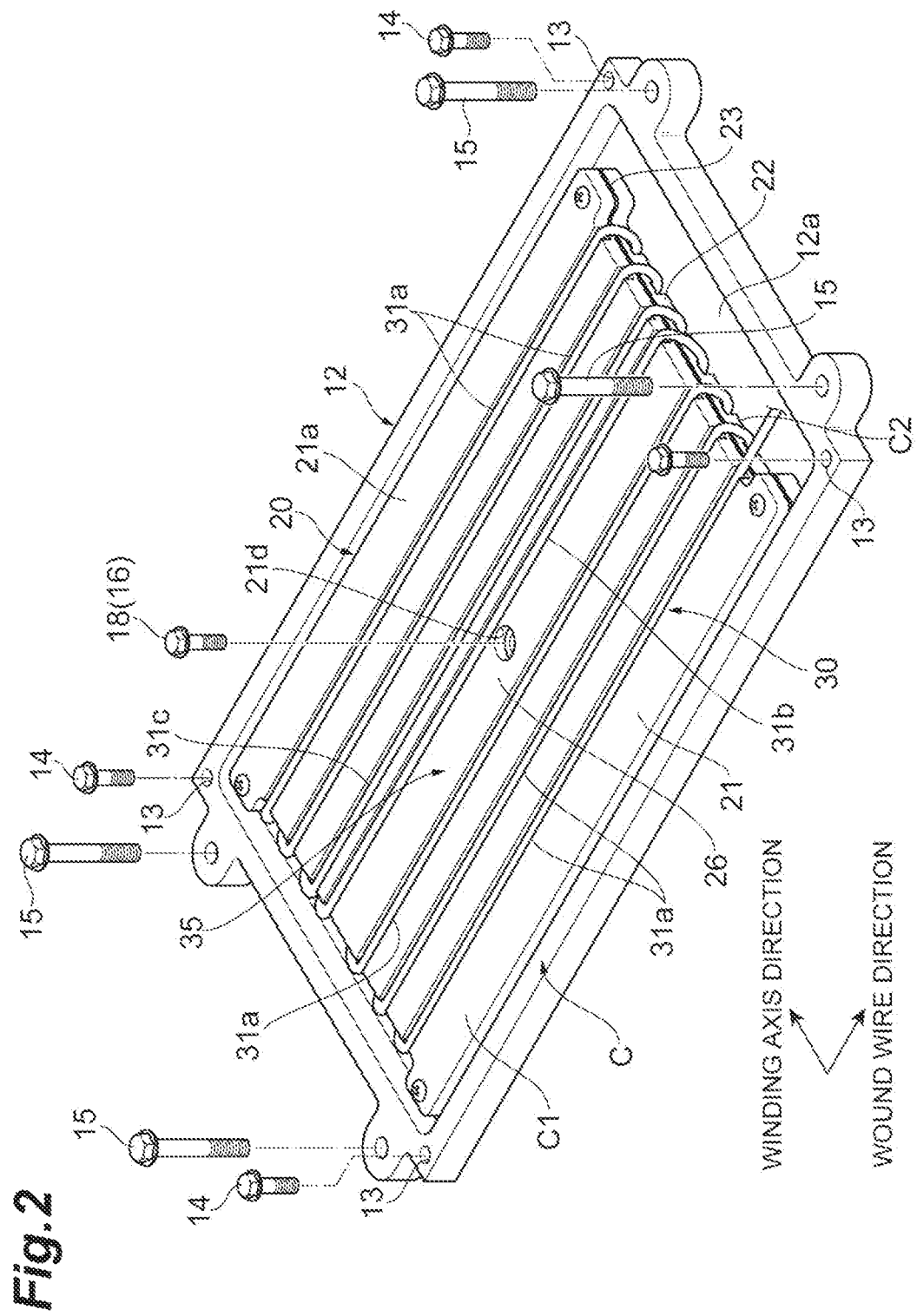
FIG. 2 is a perspective view illustrating the coil device according to the embodiment of the present disclosure.

As illustrated in FIG. 2, FIG. 3A and FIG. 3B, the coil portion C includes a conductive wire 30 corresponding to a litz wire, and a flat plate-shaped bobbin 20 around which the conductive wire 30 is wound. The bobbin 20 includes a rectangular-shaped first winding plate 21 disposed on the surface C1 side, and a rectangular-shaped second winding plate 22 disposed on the rear surface C2 side. The first winding plate 21 and the second winding plate 22 are formed using the same material (e.g., a polyphenylene sulfide resin).

A ferrite plate (magnetic member) 23 is disposed between the first winding plate 21 and the second winding plate 22. That is, the ferrite plate 23 is disposed inside the bobbin 20. In plan view, a shape and a size of the ferrite plate 23 are substantially equal to or smaller than shapes and sizes of the first winding plate 21 and the second winding plate 22. The ferrite plate 23 is sandwiched between and held by the first winding plate 21 and the second winding plate 22. The first winding plate 21 is disposed between the ferrite plate 23 and the protective cover 11. The second winding plate 22 is disposed between the ferrite plate 23 and the base 12.

For example, a plurality of groove portions 21b extending in a long-side direction of the coil portion C is formed in the first winding plate 21. The plurality of groove portions 21b is parallel to each other. A cross-sectional shape of the plurality of groove portions 21b perpendicular to the long-side direction corresponds to a rectangular shape in which one side on the protective cover 11 side is open. The groove portion 21b is recessed with respect to a surface 21a of the first winding plate 21, and has a predetermined depth.

For example, a plurality of groove portions 22b extending in the long-side direction of the coil portion C is formed in the second winding plate 22. The plurality of groove portions 22b is parallel to each other. A cross-sectional shape of the plurality of groove portions 22b perpendicular to the long-side direction corresponds to a rectangular shape in which one side on the base 12 side is open. The groove portion 22b is recessed with respect to a surface 22a of the second winding plate 22, and has a predetermined depth.

The first winding plate 21, the ferrite plate 23, and the second winding plate 22 described above are integrated with one another, and are wound with the conductive wire 30. More specifically, the conductive wire 30 is disposed inside the groove portion 21b and the groove portion 22b. As illustrated in FIG. 3A and FIG. 3B, in the coil portion C, a position at which the groove portion 21b is provided and a position at which the surface 22a is provided are different from each other in a short-side direction of the coil portion C. In other words, the groove portion 21b and the groove portion 22b are not aligned in the vertical direction (a direction perpendicular to the surface C1 of the coil portion C, that is, a plate thickness direction of the first winding plate 21 and the second winding plate 22).

According to the above configuration, the conductive wire 30 wound around the bobbin 20 includes a plurality of surface-side extending portions 31 extending on the first winding plate 21 and a plurality of rear surface-side extending portions 32 extending on the second winding plate 22. The long-side direction of the coil portion C is equal to a wound wire direction of the conductive wire 30, and the short-side direction of the coil portion C is equal to a winding axis direction of the conductive wire 30. The wound wire direction and the winding axis direction are orthogonal to (intersect with) each other. The conductive wire 30 extends in a direction which is inclined with respect to the vertical direction on an end surface of the bobbin 20 in the wound wire direction. The respective surface-side extending portions 31 and the respective rear surface-side extending portions 32 are not aligned in the vertical direction. The surface-side extending portions 31 and the rear surface-side extending portions 32 are provided in a vertically diagonal shape (in zigzag) when viewed in the wound wire direction (see FIG. 3A and FIG. 3B). When the conductive wire 30 is disposed as described above, portions of the conductive wire 30 are separated from each other as much as possible, and an insulation distance is ensured in the coil portion C.

A more detailed description will be given of the surface-side extending portions 31 and the rear surface-side extending portions 32 with reference to FIG. 3A, FIG. 3B and FIG. 4. The conductive wire 30 includes the plurality of surface-side extending portions 31 extending along the wound wire direction on the first winding plate 21. The plurality of surface-side extending portions 31 has linear shapes, and is parallel to each other. The surface-side extending portions 31 include a plurality of first extending portions 31a lined up at equal intervals in the winding axis direction, and one second extending portion 31b and one third extending portion 31c in which a gap between surface-side extending portions 31 adjacent to each other in the winding axis direction is different from that in the first extending portions 31a.

As illustrated in FIG. 3B, a distance between centers, that is, a pitch of two first extending portions 31a and 31a is a first pitch P1. A pitch of the second extending portion 31b and a first extending portion 31a adjacent to the second extending portion 31b is a second pitch P2. The second pitch P2 is larger than the first pitch P1. When distances between the surface-side extending portions 31 are compared, pitches may be used for the comparison as described above, or gaps between the surface-side extending portions 31 may be used for the comparison as illustrated in FIG. 4. A gap between the first extending portions 31a and 31a, that is, a distance between two inner end surfaces facing each other in the winding axis direction is a first gap D1. A gap between the second extending portion 31b and the first extending portion 31a adjacent to the second extending portion 31b is a second gap D2. The second gap D2 is larger than the first gap D1.

The coil portion C includes an enlarged portion 35 in which the second gap D2 between the first extending portion 31a and the second extending portion 31b adjacent to each other in the winding axis direction is wider than a gap between another first extending portion 31a and another first extending portion 31a. In other words, while the first gap D1 between the first extending portion 31a and the first extending portion 31a adjacent to each other is uniform in a plurality of portions of the coil portion C, the second gap D2 between the first extending portion 31a and the second extending portion 31b adjacent to each other is different from the first gap D1. When the enlarged portion 35 is provided, a pitch of the conductive wire 30 is non-uniform as a whole of the surface-side extending portions 31. The enlarged portion 35 may not be formed on the surface C1 of the coil portion C by the surface-side extending portions 31, and may be formed on the rear surface C2 by the rear surface-side extending portions 32 as illustrated in FIG. 4.

As illustrated in FIG. 3B, a pitch of the second extending portion 31b and the third extending portion 31c adjacent to the second extending portion 31b is a third pitch P3. The third pitch P3 is smaller than the first pitch P1. As illustrated in FIG. 4, a gap between the second extending portion 31b and the third extending portion 31c adjacent to the second extending portion 31b is a third gap D3. The third gap D3 is smaller than the first gap D1.

As illustrated in FIGS. 2 to 5, in the coil portion C, only a position of the second extending portion 31b among the surface-side extending portions 31 is shifted (leaned) to one side in the winding axis direction. FIG. 4 illustrates positions of the extending portions using a virtual line when the conductive wire 30 is wound at all equal pitches without providing the enlarged portion 35. As illustrated in FIG. 4 using the virtual line, the second gap D2 is twice or more as large as the first gap D1. The fastener 16 capable of increasing strength of the protective cover 11 is provided in the enlarged portion 35 in which a pitch of the conductive wire 30 is enlarged. A hole portion 26 in which the fastener 16 is provided is formed between the first extending portion 31a and the second extending portion 31b in the bobbin 20 of the coil portion C. According to this arrangement, interference in the conductive wire 30 by the fastener 16 is avoided.

As illustrated in FIG. 3A and FIG. 3B, the conductive wire 30 includes the plurality of rear surface-side extending portions 32 extending along the wound wire direction on the second winding plate 22. The plurality of rear surface-side extending portions 32 has linear shapes, and is parallel to each other. The rear surface-side extending portions 32 include a plurality of first extending portions 32a lined up at equal intervals in the winding axis direction. A distance between centers, that is, a pitch of two extending portions 32a and 32a is a first pitch P1. As illustrated in FIG. 4, a gap between the extending portions 32a and 32a, that is, a distance between two inner end surfaces facing each other in the winding axis direction is a first gap D1. In this way, the first gap D1 between the extending portion 32a and the extending portion 32a adjacent to each other is uniform in the coil portion C.

The enlarged portion 35 is a portion in which "a gap between extending portions adjacent to each other in the winding axis direction is wider than a gap between other extending portions". Herein, when "the gap between the other extending portions" is calculated, various schemes are considered. For example, when most extending portions have the first gap D1 between the first extending portions 31a and 31a in the coil portion C as described above, the first gap D1 may be set as a standard. When gaps between adjacent extending portions are different from each other (or a dispersion is present), an average of gaps at a plurality of points may be calculated, and a portion, in which a gap is wider than the average, may be set as an enlarged portion. An exposed surface of the bobbin 20 formed between adjacent extending portions (e.g., an area per unit length in the wound wire direction) may be calculated, and a portion, in which an exposed surface is larger than that of another portion, may be set as an enlarged portion. An average of exposed areas of the bobbin 20 at a plurality of points may be calculated, and a portion, in which an exposed area is larger than the average, may be set as an enlarged portion.

As illustrated in FIG. 3B, symmetry between the surface-side extending portions 31 and the rear surface-side extending portions 32 is maintained in the coil portion C except for the second extending portion 31b of the surface-side extending portions 31. The plurality of first extending portions 31a, the second extending portion 31b, and the third extending portion 31c correspond to the plurality of rear surface-side extending portions 32, and a relationship of a vertically diagonal shape (a zigzag positional relation) is maintained.

Figure 5:
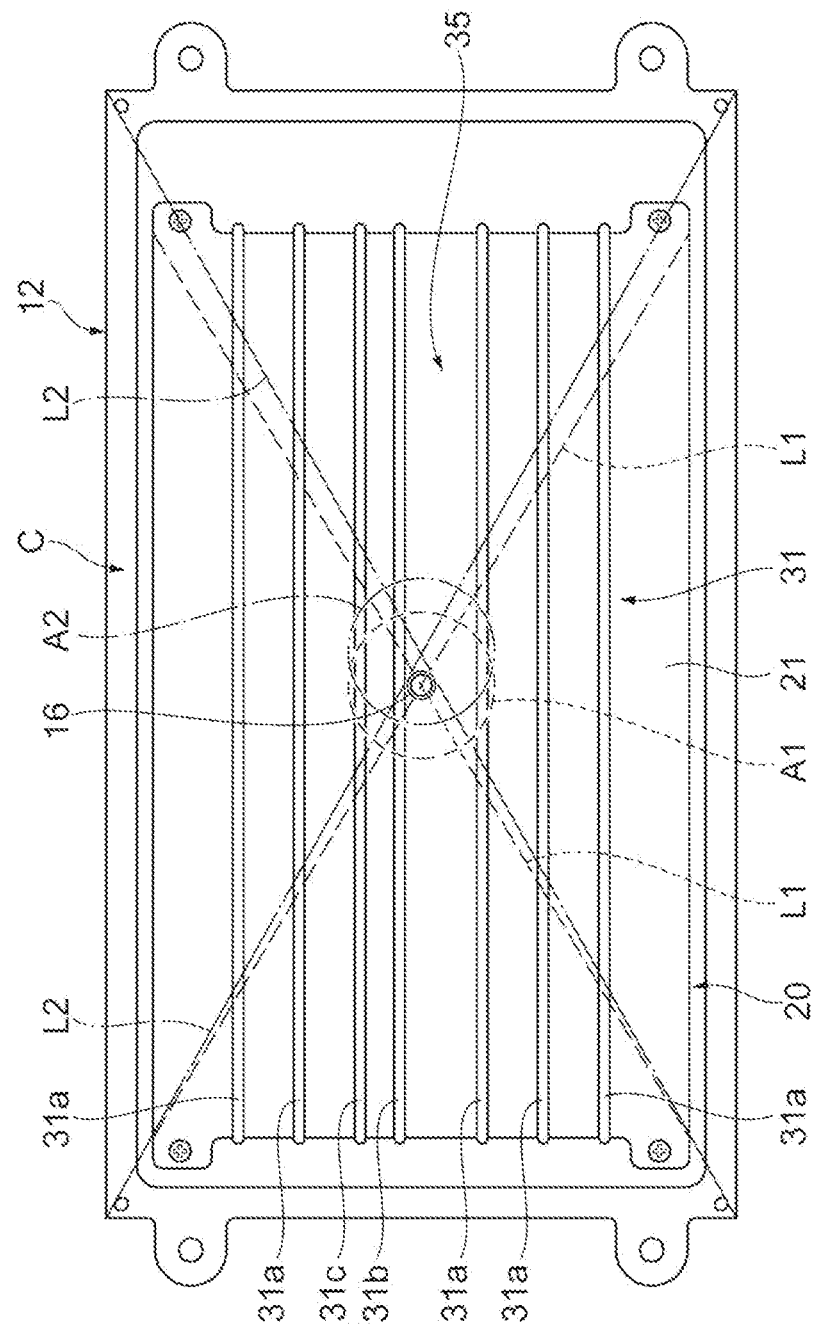
FIG. 5 is a plan view illustrating central regions of a housing and a bobbin.

A detailed description will be given of the fastener 16 with reference to FIG. 4 and FIG. 5. As illustrated in FIG. 5, the fastener 16 is provided in a first central region A1 which is a central region of the bobbin 20 in the wound wire direction and the winding axis direction. In other words, the fastener 16 is provided at an intersection point of first diagonal lines L1 and L1, that is, a central point of the bobbin 20.

The fastener 16 may be provided inside the first central region A1, a center of which corresponds to the intersection point of first diagonal lines L1 and L1 of the bobbin 20. The fastener 16 may be provided in a second central region A2 which is a central region of the housing 10 (that is, the protective cover 11 or the base 12) in the wound wire direction and the winding axis direction. In other words, the fastener 16 may be provided at an intersection point of second diagonal lines L2 and L2, that is, a central point of the base 12, or may be provided inside the second central region A2, a center of which corresponds to the intersection point.

As illustrated in FIG. 4, the fastener 16 is provided along the vertical direction. The fastener 16 is orthogonal to the wound wire direction and the winding axis direction. The fastener 16 penetrates through the protective cover 11, the first winding plate 21, the ferrite plate 23, and the second winding plate 22. A distal end portion 17c of the fastener 16 does not penetrate through the base 12, and terminates inside the base 12. More specifically, the fastener 16 includes a first screw member 17 screwed to the base 12 and a second screw member 18 screwed to the first screw member 17. Each of the first screw member 17 and the second screw member 18 is made of a non-magnetic material. The first screw member 17 and the second screw member 18 may be non-magnetic or magnetic. The fastener 16 strongly fastens the protective cover 11, the first winding plate 21, the ferrite plate 23, the second winding plate 22, and the base 12 using two (a plurality of) screw members. In addition, when the first screw member 17 and the second screw member 18 are made of a material having a thermal conductivity, a portion of heat of the ferrite plate 23 heated by wireless power transfer is successively transferred to a seat 21c, the first screw member 17, and the second screw member 18, and is released to the outside from a head portion 18a. In particular, when the first screw member 17 and the second screw member 18 are made of a material having a high thermal conductivity (e.g., metal), heat release effect is improved.

For example, a circular hole portion 23a is provided at a position corresponding to the fastener 16 in the ferrite plate 23. The first winding plate 21 includes a cylindrical seat (protrusion) 21c that protrudes to the inside of the hole portion 23a. The hole portion 23a may be a rectangle. A circular through-hole 21d is provided at a center of the seat 21c. A through-hole 22c that communicates with the through-hole 21d is formed in the second winding plate 22. The seat 21c of the first winding plate 21 is disposed inside the hole portion 23a of the ferrite plate 23. A rear surface of the seat 21c contacts the second winding plate 22.

The first screw member 17 includes a disc-shaped flange portion 17a that contacts the seat 21c of the first winding plate 21 from the protective cover 11 side, a shaft portion 17b formed on a distal end side of the flange portion 17a to penetrate through the first winding plate 21, the ferrite plate 23, and the second winding plate 22, and the distal end portion 17c formed on a distal end side of the shaft portion 17b and screwed to the base 12. The shaft portion 17b is disposed inside the through-hole 21d and the through-hole 22c. A female screw and a screw insertion hole to which the second screw member 18 may be screwed are formed in the shaft portion 17b. The flange portion 17a, the shaft portion 17b, and the distal end portion 17c are integrally formed. The hole portion 26 of the coil portion C described above (see FIG. 2) includes the through-hole 21d, the hole portion 23a, and the through-hole 22c.

The second screw member 18 includes the head portion 18a with which a rotating tool, etc. can be engaged, a shaft portion 18b formed on a distal end side of the head portion 18a to penetrate through the protective cover 11, and a distal end portion 18c screwed to the shaft portion 17b of the first screw member 17. The shaft portion 18b is disposed inside the through-hole 11c of the protective cover 11. The head portion 18a, the shaft portion 18b, and the distal end portion 18c are integrally formed.

A seal member is appropriately provided between the protective cover 11 and the flange portion 17a. A cylindrical member 19 is provided between the shaft portion 18b of the second screw member 18 and the seat 11b of the protective cover 11.

When fastening is performed using the fastener 16, the second winding plate 22 in which the through-hole 22c is provided, the ferrite plate 23 in which the hole portion 23a is provided, and the first winding plate 21 in which the through-hole 21d is provided are superposed. The first winding plate 21, the ferrite plate 23, the second winding plate 22, and the base 12 are fastened by screwing the first screw member 17 in the base 12. The flange portion 17a immobilizes the seat 21c of the first winding plate 21 on the base 12 side. In this way, the seat 21c is pressed against the second winding plate 22, the ferrite plate 23 sandwiched between the first winding plate 21 and the second winding plate 22 is fixed. Then, the seat 11b of the protective cover 11 is superposed on the seat 21c of the first winding plate 21 through the flange portion 17a. The protective cover 11 is fastened to the first winding plate 21, the ferrite plate 23, the second winding plate 22, and the base 12 by screwing the second screw member 18 in the base 12. The protective cover 11 is supported by the base 12 and the coil portion C (bobbin 20) through the flange portion 17a of the fastener 16.

The seat 11b of the protective cover 11 is recessed from the end surface 11a and formed in a cylindrical shape. A cylindrical space S is formed in a recessed portion of the seat 11b. The head portion 18a of the second screw member 18 is accommodated in the space S. An upper end surface of the head portion 18a is positioned on the base 12 side from the end surface 11a. That is, the head portion 18a is installed on the base 12 side from the end surface 11a of the protective cover 11. As illustrated in FIG. 1, the protective cover 11 is disposed on a lower side in a state in which the coil device 5 is installed in the EV. When the head portion 18a of the fastener 16 is positioned on the base 12 side from the end surface 11a of the protective cover 11 (that is, a lower end surface of the coil device 5), a position of a lowermost end (that is, a minimum height) of the coil device 5 may be prevented from being lowered by the fastener 16. In this way, it is possible to avoid touching an object by the head portion 18a of the fastener 16 when the EV is driven or stopped.

According to the coil device 5 of the present embodiment, the housing 10 is accommodated in the coil portion C that includes the bobbin 20 and the ferrite plate 23. The plurality of surface-side extending portions 31 and rear surface-side extending portions 32 extending in the wound wire direction on the bobbin 20 have gaps in the winding axis direction. The enlarged portion 35, in which the second gap D2 between the first extending portion 31a and the second extending portion 31b adjacent to each other is wider than the first gap D1 between other first extending portions 31a and 31a, is provided in the coil portion C. The fastener 16 is provided in the enlarged portion 35. The bobbin 20 and the housing 10 are fastened by the fastener 16. The gap between the first extending portion 31a and the second extending portion 31b is wide in the enlarged portion 35, and thus it is possible to avoid interfering in the surface-side extending portions 31 and the rear surface-side extending portions 32 by the fastener 16 (see FIG. 4). Strength of the housing 10 is increased in the coil device 5 of solenoid type.

The housing 10 includes the protective cover 11 and the base 12. Strength of the housing 10 is increased by fastening the bobbin 20 and both the protective cover 11 and the base 12 using the fastener 16.

The ferrite plate 23 is provided between the protective cover 11 and the base 12. The fastener 16 penetrates the ferrite plate 23 to fasten the protective cover 11 and the base 12. Therefore, the housing 10 is more strongly fixed to the bobbin 20. Further, movement of the ferrite plate 23 in the wound wire direction and the winding axis direction is regulated.

The seat 11b of the protective cover 11 is pressed against the second winding plate 22 and the base 12 by the fastener 16. Therefore, the first winding plate 21 and the second winding plate 22 are more strongly fastened. The ferrite plate 23 is sandwiched between and held by the first winding plate 21 and the second winding plate 22. In general, the ferrite plate 23 may be fragile. However, according to the above-described configuration, strength of the ferrite plate 23 is increased.

The fastener 16 includes two members corresponding to the first screw member 17 and the second screw member 18. First, the seat 21c of the first winding plate 21 is pressed against the second winding plate 22 and the base 12 by the first screw member 17. The protective cover 11 is fastened to the first winding plate 21, the second winding plate 22, and the base 12, which are integrated with one another, by the second screw member 18. In this way, the fastener 16 may be reliably and easily provided by performing fastening in two discrete steps.

Since the fastener 16 penetrates through the housing 10, fastening using the fastener 16 may be easily performed from the outside of the housing 10. Therefore, the fastener 16 may be reliably and easily provided.

The fastener 16 is positioned nearer to the second extending portion 31b between the first extending portion 31a and the second extending portion 31b. The third gap D3 between the second extending portion 31b and the third extending portion 31c is narrower than the first gap D1 between the other first extending portions 31a and 31a. Thus, a gap between the surface-side extending portions 31 (that is, a position of the conductive wire 30) may not be changed or adjusted in a portion other than the enlarged portion 35 in which the fastener 16 is provided. Therefore, an influence on a magnetic field is minimized. It is possible to minimize a variation of a magnetic field distribution due to a magnetic flux leakage with respect to a magnetic field distribution generated by the coil portion C around which the conductive wire is wound at the first pitch P1 in a whole area.

Since the fastener 16 is provided in the first central region A1 of the bobbin 20 in the wound wire direction and the winding axis direction, strength of the housing 10 is increased at a position corresponding to the first central region A1 of the bobbin 20. When the fastener 16 is not provided, the housing 10 is relatively easily bent at a position corresponding to the second central region A2 of the bobbin 20. Strength of housing 10 is further improved by the fastener 16.

Even when the fastener 16 is provided in the second central region A2 of the housing 10 in the wound wire direction and the winding axis direction, strength of the housing 10 is increased at a position corresponding to the second central region A2 of the housing 10. When the fastener 16 is not provided, the housing 10 is relatively easily bent in the second central region A2. Strength of housing 10 is further improved by the fastener 16.

The coil device 5 has advantageous effect in contrast with the above respective conventional art documents. In the above Patent Literature 1, there is no examination of a scheme of attaching the power reception coil device to the outside of the vehicle. When the power reception coil device is installed inside the vehicle, the power reception coil device is supported by the chassis. However, it is unclear how to suspend the power reception coil device when the power reception coil device is installed to be exposed to the outside of the chassis of the vehicle. In general, as a distance between the power transmission coil device and the power reception coil device decreases, transmitting efficiency increases. Thus, there is a great need to attach the power reception coil device to the outside of the chassis of the vehicle. In this regard, according to the coil device 5 of the present embodiment, the base 12 is fixed to the outside of the chassis. When the protective cover 11 facing the power transmission coil device 4 is made of a non-magnetic material, for example, resin, a magnetic flux generated by the coil device 4 is not affected. Therefore, efficient wireless power transfer is achieved. Further, when a non-magnetic and non-conducting material is used for the protective cover 11, power efficiency of wireless power transfer may be further increased. When the base 12 facing the vehicle body side is made of a non-magnetic and conductive material, structural strength of the coil device 5 may be improved while suppressing an influence on a magnetic field distribution between the coil device 4 and the coil device 5. In addition, the non-magnetic and conductive base 12 functions as a magnetic shielding, and thus magnetic fluxes heading the coil devices 4 and 5 increase, and power efficiency may be improved.

In the above Patent Literature 2, an outer circumferential portion of the bobbin is attached to the vehicle, and thus a central region is not fixed. For this reason, there is concern that a central region may be easily bent and broken, thereby causing damage due to external impact even when the power reception coil device of Patent Literature 1 is attached as in Patent Literature 2. In addition, the power reception coil device is subjected to thermal strain due to power reception, or receives a vibration of the vehicle. The central region, which is not fixed, is easily affected by a force generated in these circumstances. In this regard, according to the coil device 5 of the present embodiment, strength of the central region of the housing 10 is increased, and the above-mentioned problem is solved.

The above Patent Literature 3 discloses that a central region of the substrate is bolted. However, only the substrate is fixed, and the protective cover is not fixed. For this reason, a central region of the protective cover is bent similarly to Patent Literature 2. In addition, Patent Literature 2 mentions a spacer for ensuring strength of the protective cover. However, when the power reception unit is attached backward, and the protective cover is bent, a gap is generated between the spacer and the protective cover. Thus, there is difficulty in ensuring strength of the protective cover. In this regard, in the coil device 5 of the present embodiment, the housing 10 and the bobbin 20 are fastened by the fastener 16, and thus strength of the housing 10 is ensured.

Figure 16:
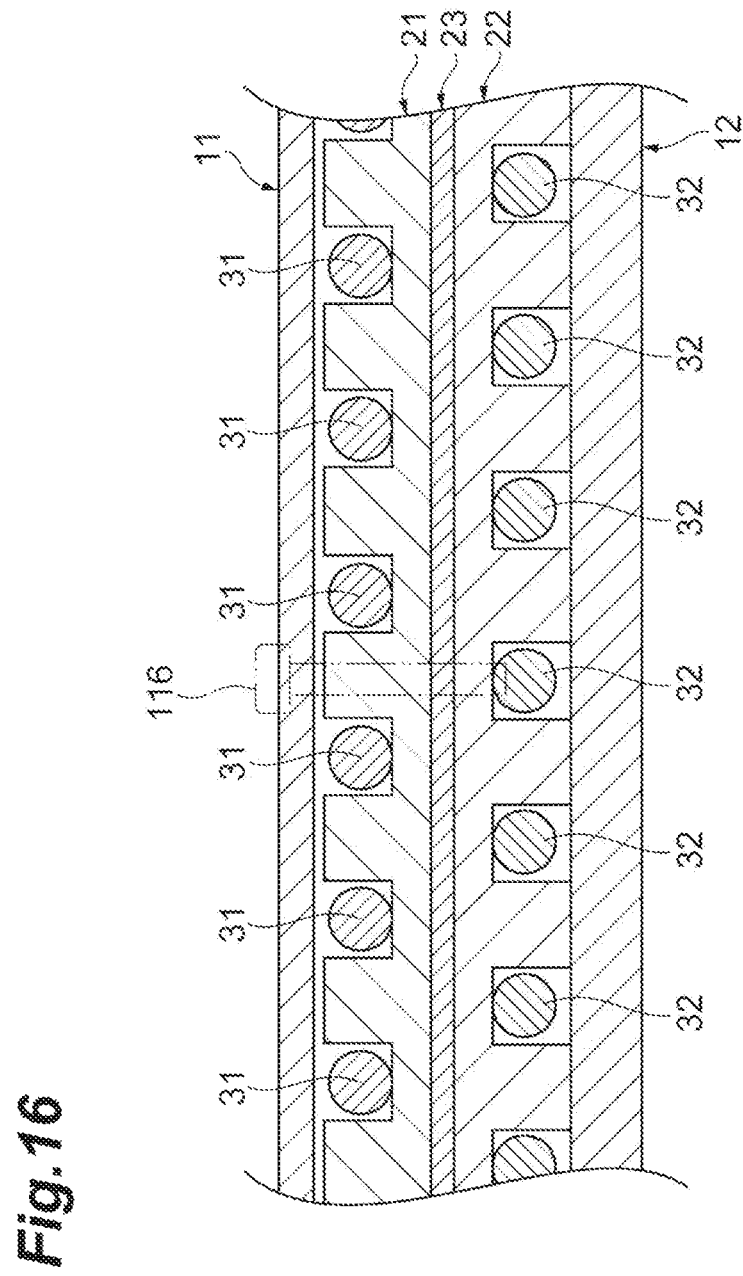
FIG. 16 is a cross-sectional view describing a case in which a fastener is provided in a conventional solenoid coil.

Originally, the bolt or the spacer may be provided in the central region of the power reception unit as in Patent Literature 3 since the coil has a circular shape in which a space is present in the central region. There is difficulty in employing a scheme of Patent Literature 3 in a solenoid coil as in Patent Literature 1 in which a conductive wire is wound around a central region. In addition, a cross-sectional view of the power reception coil device is given in FIG. 7 of Patent Literature 1, and conductive wire positions of an upper ferrite housing portion and a lower ferrite housing portion are matched with each other. Thus, the bolt may be vertically inserted so as not to interfere in the conductive wire. However, a pitch of the conductive wire may not be longer than a width of the bolt. As disclosed in Patent Literature 2 (paragraph 0025), when the conductive wire is sparsely and densely wound, there are problems of heating due to an eddy current in a dense part and a magnetic flux leakage in a sparse part, and thus the conductive wire is preferably wound at equal intervals. For this reason, when the pitch of the conductive wire is set to be wider than the width of the bolt, the power reception coil device increases in size as a whole. However, the power reception coil device is required to be reduced in size due to a characteristic that the power reception coil device is installed in a vehicle in which an installation position is restricted. In addition, the conductive wire needs to be densely wound to improve transmitting efficiency. For this reason, there is difficulty in setting all pitches of the conductive wire to be wider than the width of the bolt. Further, positions of the conductive wire are provided in a diagonal shape rather than being vertically matched in many cases in terms of ensuring an insulation distance (necessity of separating pieces of the conductive wire as much as possible) (see the surface-side extending portions 31 and the rear surface-side extending portions 32 illustrated in FIG. 16). In this case, one of upper and lower pitches of the conductive wire (a gap between the surface-side extending portions 31 and 31) includes a position of another conductive wire position (the rear surface-side extending portion 32), and thus there is difficulty in inserting a bolt 116 such that the conductive wire is not interfered. In this regard, in the coil device 5 of the present embodiment, the above-mentioned various problems are overcome.

The present disclosure is not limited to the above-described embodiment. The present invention includes various modifications. In the above embodiment, a description has been given of a mode in which arrangement of the fastener 16 is determined based on the first central region A1 of the bobbin 20 or the second central region A2 of the housing 10. However, arrangement of the fastener 16 may be determined based on another criterion.

Figure 6A:
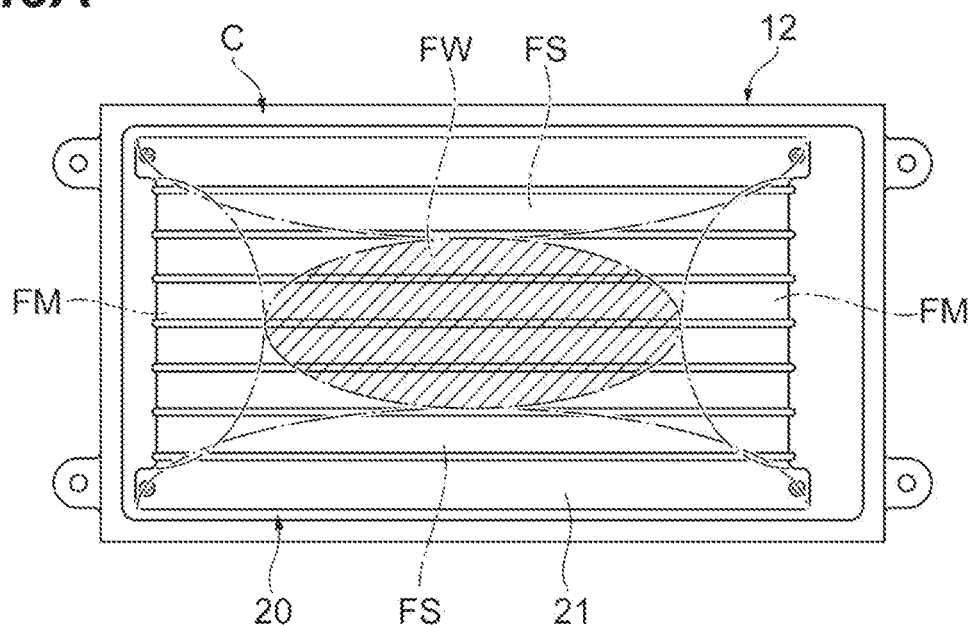
FIG. 6A is a plan view illustrating an installation position of the fastener when a magnetic flux density or power efficiency is considered.

For example, as illustrated in FIG. 6A, arrangement of the fastener 16 may be determined based on a viewpoint on a magnetic flux. In the bobbin 20, regions FS and FS in which a magnetic flux is strong are formed at both end portions in the winding axis direction. Regions FM and FM in which a magnetic flux is moderate are formed at both end portions in the wound wire direction. A magnetic flux is relatively weak in a central region FW in the winding axis direction and the wound wire direction except for the region FS and the region FM. In some modes, one or a plurality of fasteners 16 may be disposed in the region FM in which the magnetic flux is weak.

A description will be given of a specific range of the region FW in which the magnetic flux is weak. The regions FS and FS in which the magnetic flux is strong are regions corresponding to 20% to 40% of a whole length of the coil portion C in the winding axis direction from both end portions of the coil portion C. The regions FM and FM in which the magnetic flux is moderate are regions corresponding to 20% to 40% of a whole length of the coil portion C in the wound wire direction from both end portions of the coil portion C. Therefore, for example, the region FW in which the magnetic flux is weak corresponds to a region in a range of 20% to 60% in the middle in the winding axis direction and a region in a range of 20% to 60% in the middle in the winding axis direction.

When a determination scheme based on the viewpoint on the magnetic flux is described from another point of view, the fastener 16 may be provided in a region in which a decrease in power efficiency due to provision of the fastener 16 is less than or equal to 0.1%. Power efficiency refers to a ratio of power at a certain place inside the power receiver 3 to power at a certain place inside the power transmitter 2. For example, power efficiency refers a ratio of power of an output of a rectifier of the power receiver 3 to power of an input of an inverter of the power transmitter 2. In this case, an influence on power efficiency by the fastener 16 may be made as small as possible. When the determination scheme based on the viewpoint on the magnetic flux is described from another different point of view, the fastener 16 may be provided in a region in which a magnetic flux density in the coil portion C is lower than that in another region. In this case, an influence on a magnetic flux by the fastener 16 may be made as small as possible. An average magnetic flux density in a plurality of regions may be calculated, and the fastener 16 may be provided in a region in which a magnetic flux density is lower than the average. The fastener 16 may be provided in a region in which a magnetic flux density is lowest.

Figure 6B:
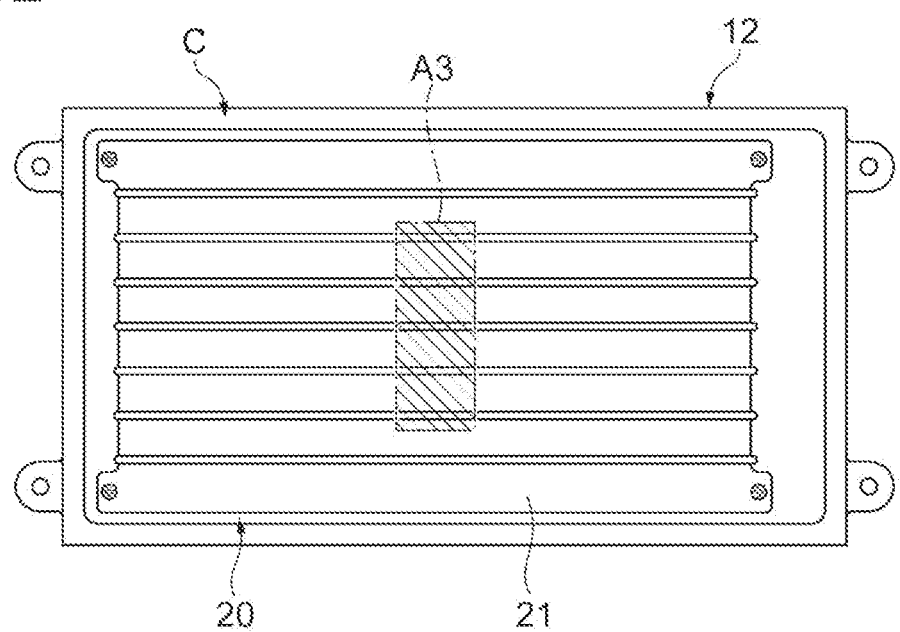
FIG. 6B is a plan view illustrating an installation position of the fastener when strength is considered.

As illustrated in FIG. 6B, arrangement of the fastener 16 may be determined based on a viewpoint on strength. In some modes, one or a plurality of fasteners 16 may be provided in a rectangular-shaped region A3 extending in a short-side direction of the bobbin 20 (that is, the winding axis direction) in which the intersection point of the first diagonal lines L1 and L1 of the bobbin 20 is set as a center.

Figure 7:
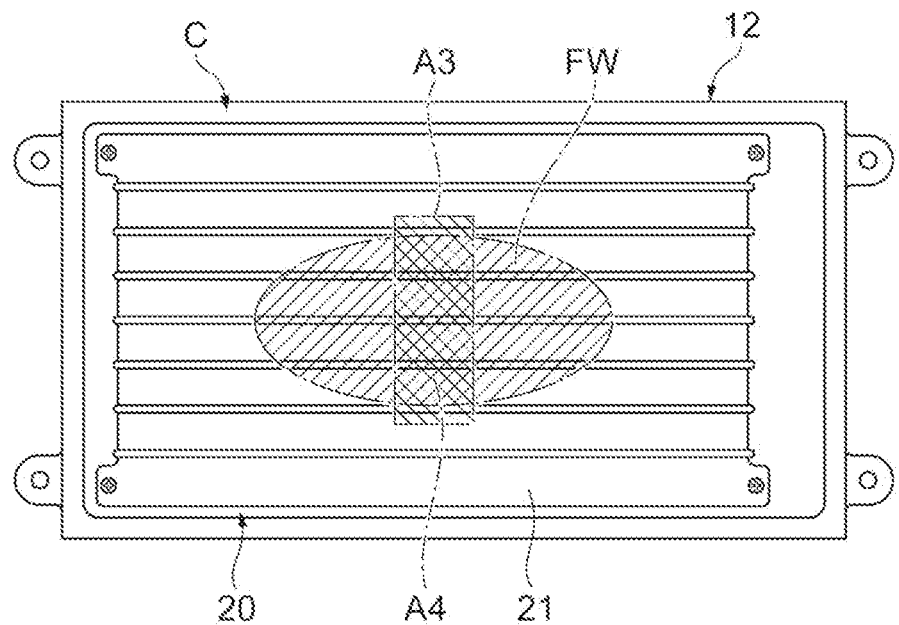
FIG. 7 is a plan view illustrating a region in which a region illustrated in FIG. 6A overlaps a region illustrated in FIG. 6B.

As illustrated in FIG. 7, one or a plurality of fasteners 16 may be provided in a region A4 where the region FW in which the magnetic flux is weak overlaps the rectangular-shaped region A3.

Figure 8:
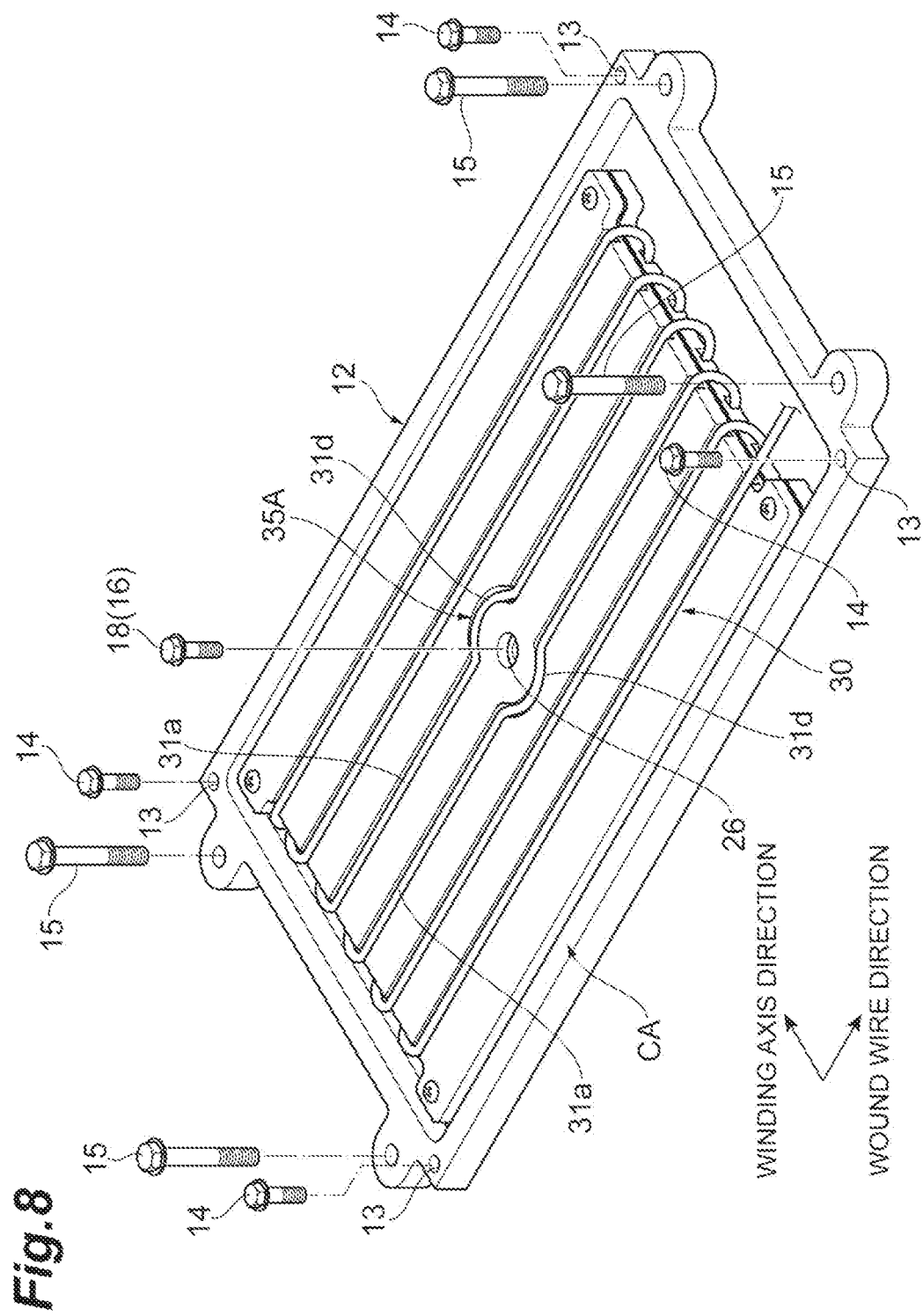
FIG. 8 is a perspective view illustrating a coil device according to another embodiment.

As illustrated in FIG. 8, an enlarged portion 35A may be provided by providing fourth extending portions 31d and 31d, a gap of which is widened only in a part in the wound wire direction. In this coil portion CA, the fourth extending portion 31d, which is curved in an arc, is provided in a middle portion of a first extending portion 31a having a linear shape. The enlarged portion 35A is provided in the first central region A1 (see FIG. 5). The fastener 16 is provided in the enlarged portion 35A. In other words, the enlarged portion 35A is provided to circle around the fastener 16.

Figure 9A:
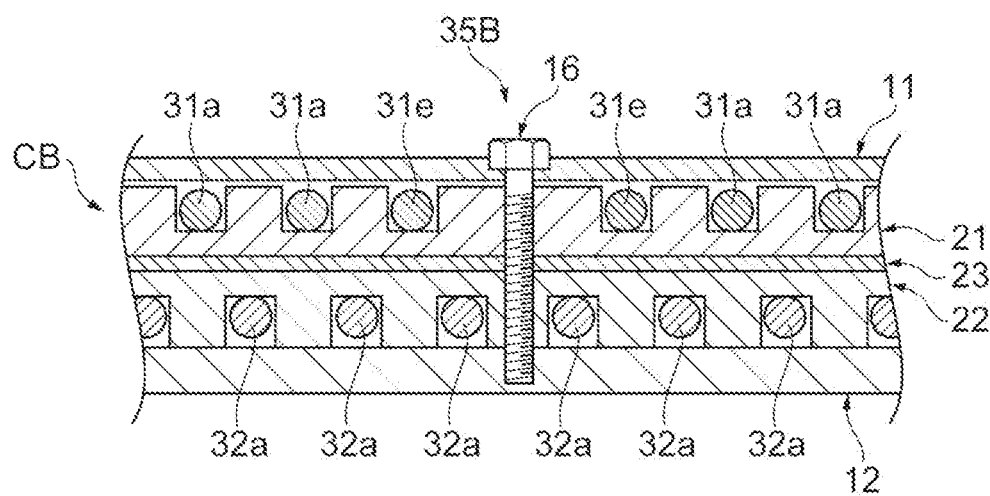
FIG. 9A is a cross-sectional view schematically illustrating a portion in which a fastener is provided in another embodiment.
Figure 9B:
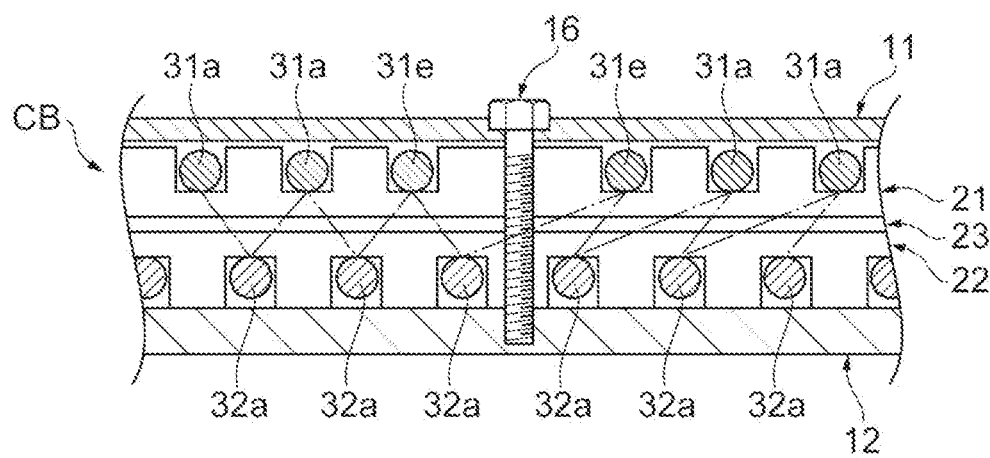
FIG. 9B is a diagram for description of a positional relationship of a conductive wire of FIG. 9A in another embodiment.

As illustrated in FIG. 9A, for example, it is possible to have a coil portion CB in which fifth extending portions 31e and 31e are provided on the first winding plate 21. Here, the fifth extending portions 31e and 31e have a pitch which is twice as large as (an integer multiple) of the first pitch P1 between the first extending portions 31a and 31a. In this case, when an enlarged portion 35B is provided, the number of turns in the first winding plate 21 is decreased to be smaller than the number of turns in the second winding plate 22. As illustrated in FIG. 9B, symmetry between the surface-side extending portions 31 and the rear surface-side extending portions 32 is not maintained.

As illustrated in FIG. 10, it is possible to employ a mode in which a fastener is divided into two parts corresponding to a fastener 16C on the protective cover 11 side and a fastener 16C on the base 12 side. An enlarged portion 35C is configured similarly to the enlarged portion 35B illustrated in FIG. 9A. In this case, the two fasteners 16C are provided from the outside of the housing 10. The fastener 16C on the protective cover 11 side penetrates through the protective cover 11, and does not penetrate through the ferrite plate 23. The fastener 16C on the base 12 side penetrates through the base 12, and does not penetrate through the ferrite plate 23. In other words, a distal end of the fastener 16C terminates inside the first winding plate 21 or the second winding plate 22. A seal member is provided between the fastener 16C on the protective cover 11 side and the protective cover 11. A seal member is provided between the fastener 16C on the base 12 side and the base 12.

Figure 11:
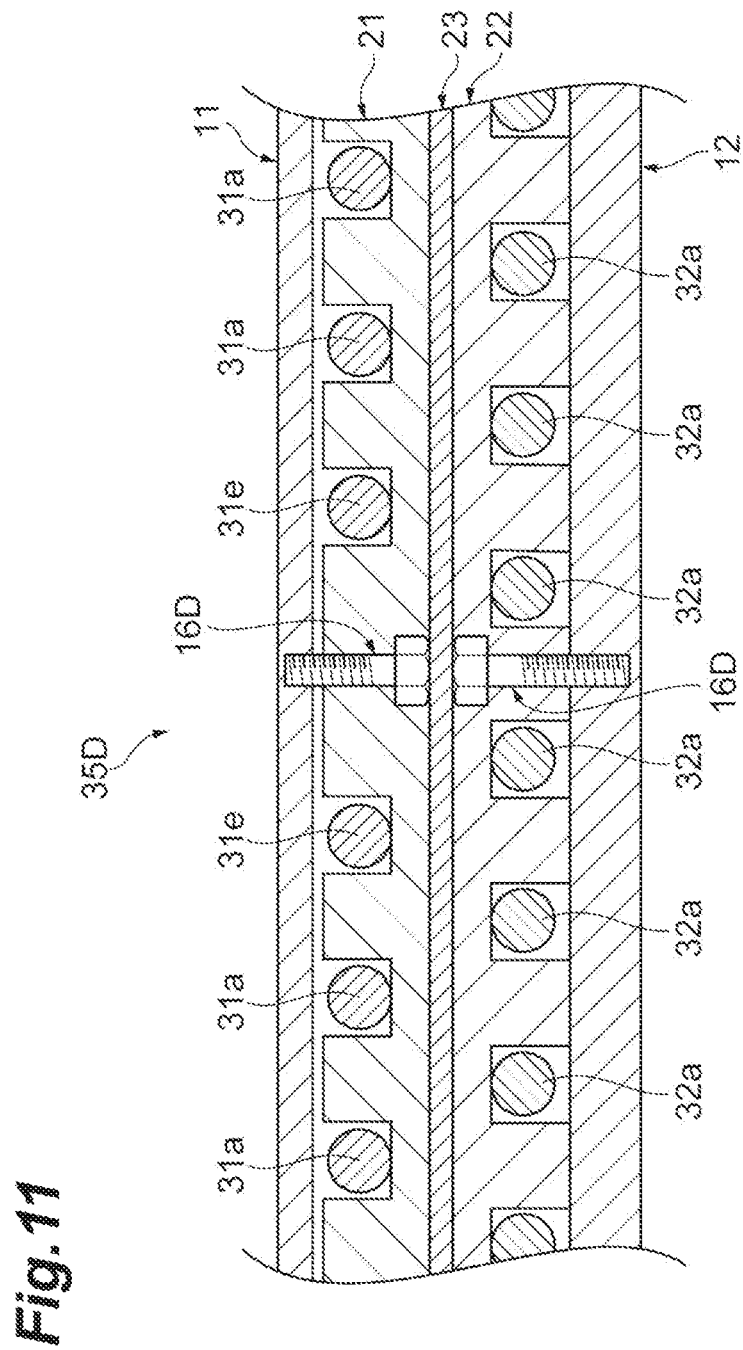
FIG. 11 is a cross-sectional view schematically illustrating a portion in which a fastener is provided in another embodiment.

As illustrated in FIG. 11, it is possible to employ a mode in which a fastener is divided into two parts corresponding to a fastener 16D on the protective cover 11 side and a fastener 16D on the base 12 side. An enlarged portion 35D is configured similarly to the enlarged portion 35B illustrated in FIG. 9A. In this case, the two fasteners 16D and 16D are provided from the inside of the bobbin 20 (that is, the ferrite plate 23 side of the first winding plate 21 and the ferrite plate 23 side of the second winding plate 22). The fastener 16D on the protective cover 11 side does not penetrate through the protective cover 11 and the ferrite plate 23. The fastener 16D on the base 12 side does not penetrate through the base 12 and the ferrite plate 23. In other words, a base end of the fastener 16D does not protrude from a surface of the first winding plate 21 or the second winding plate 22 on the ferrite plate 23 side. A distal end of the fastener 16D on the protective cover 11 side terminates inside the protective cover 11. A distal end of the fastener 16D on the base 12 side terminates inside the base 12. A seal member is not needed between the fastener 16D on the protective cover 11 side and the protective cover 11. A seal member is not needed between the fastener 16D on the base 12 side and the base 12.

Figure 12:
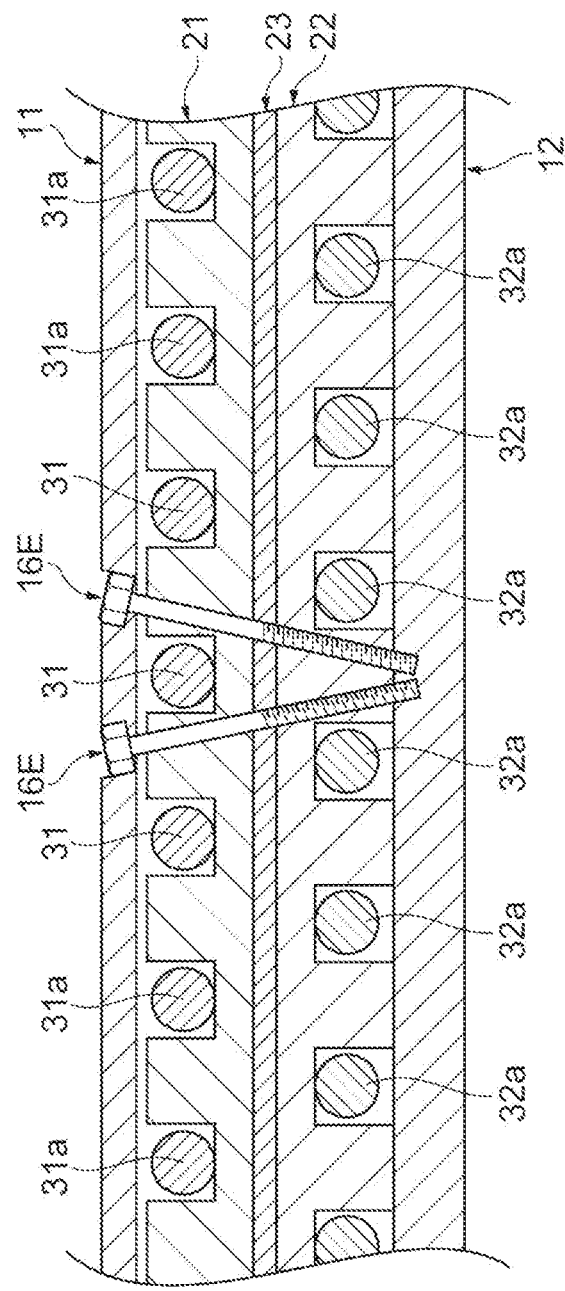
FIG. 12 is a cross-sectional view schematically illustrating a portion in which a fastener is provided in another embodiment.

As illustrated in FIG. 12, it is possible to employ a mode in which two fasteners 16E and 16E are provided on the protective cover 11 side. The fasteners 16E and 16E are obliquely disposed with respect to a virtual plane which is perpendicular to the winding axis direction. The fasteners 16E and 16E form an angle with respect to the virtual plane which is perpendicular to the winding axis direction. The fasteners 16E and 16E are provided to avoid interference by a surface-side extending portion 31 and an extending portion 32a on the base 12 side close to each other. The fasteners 16E and 16E penetrate through the protective cover 11 and the ferrite plate 23. Distal ends of the fasteners 16E and 16E terminate inside the base 12. A seal member is provided between the fasteners 16E and 16E and the protective cover 11.

Figure 13:
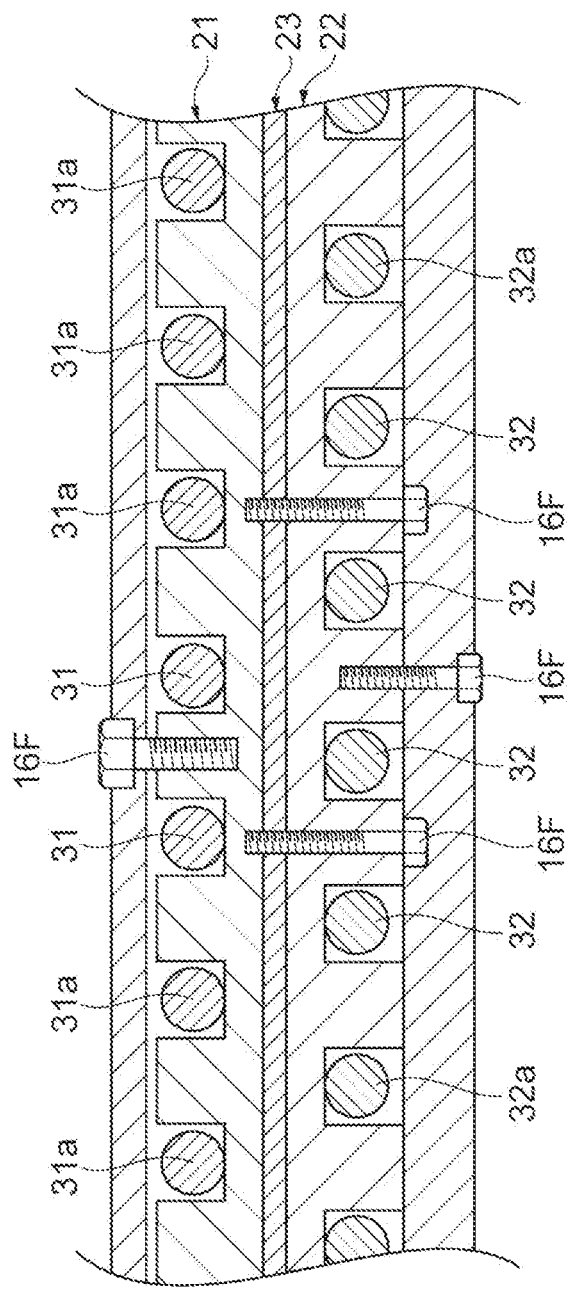
FIG. 13 is a cross-sectional view schematically illustrating a portion in which a fastener is provided in another embodiment.

As illustrated in FIG. 13, it is possible to employ a mode in which a plurality of miniaturized screw members is used. FIG. 13 illustrates a case in which four fasteners 16F are provided. A thickness (diameter) of each of the fasteners 16F may be appropriately changed. For example, one medium-sized fastener 16F is used on the protective cover 11 side to fasten the protective cover 11 and the first winding plate 21. The second winding plate 22 and the ferrite plate 23 are fastened by two small-sized fasteners 16F and 16F on the base 12 side. Further, the base 12 and the second winding plate 22 are fastened by one small-sized fastener 16F. A seal member is provided between the fastener 16F and the protective cover 11 or the base 12 only when the fastener 16F penetrates through the protective cover 11 or the base 12. The "middle-sized fastener" and the "small-sized fastener" correspond to thicknesses (diameters) when the one fastener 16 illustrated in FIG. 3A and FIG. 3B is set as a criterion. When a plurality of middle-sized or small-sized fasteners is used, an influence on a magnetic field distribution may be reduced.

Figure 14:
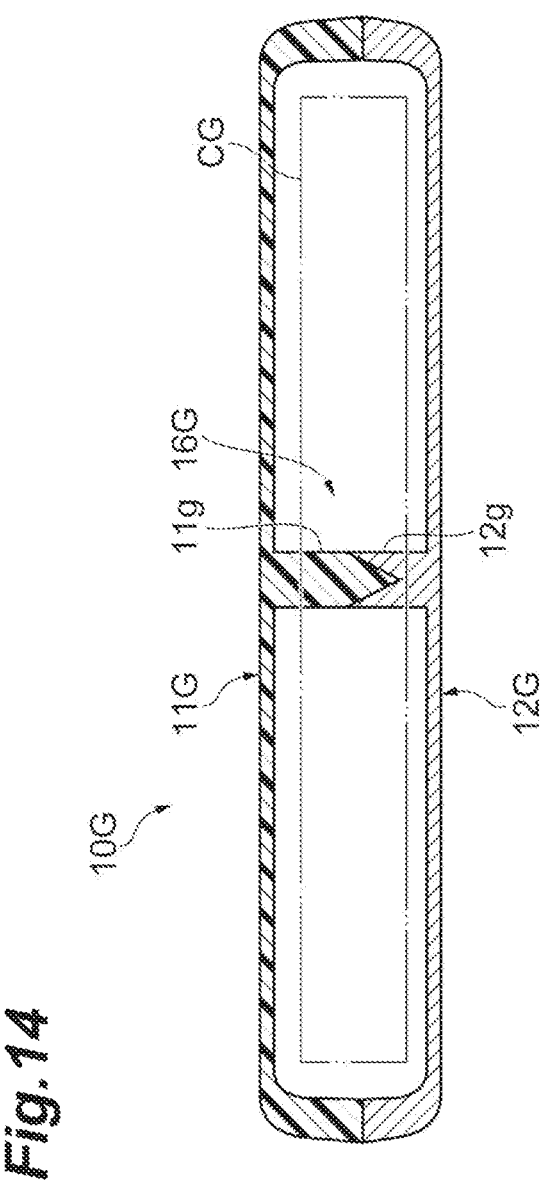
FIG. 14 is a cross-sectional view schematically illustrating a key structure of a housing in another embodiment.

As illustrated in FIG. 14, a key structure may be provided inside the protective cover 11 and the base 12. That is, a fastener 16G includes a first combined member 11g integrally provided with a protective cover 11G to protrude toward a base 12G, and a second combined member 12g integrally provided with the base 12G to protrude toward the protective cover 11G. At least one of the first combined member 11g and the second combined member 12g is disposed inside a coil portion CG. In other words, at least one of the first combined member 11g and the second combined member 12g intersects with (enters) the coil portion CG. The first combined member 11g and the second combined member 12g are combined together. More specifically, the fastener 16G is configured such that a distal end of the first combined member 11g fits into a depression of a distal end of the second combined member 12g. As the protective cover 11G is further pressed against the base 12G fastening strength between the first combined member 11g and the second combined member 12g increases. In this case, the fastener 16G is integrally provided with a housing 10G, and does not penetrate through the housing 10G, and thus a seal around the fastener 16G is not needed.

Figure 15A:
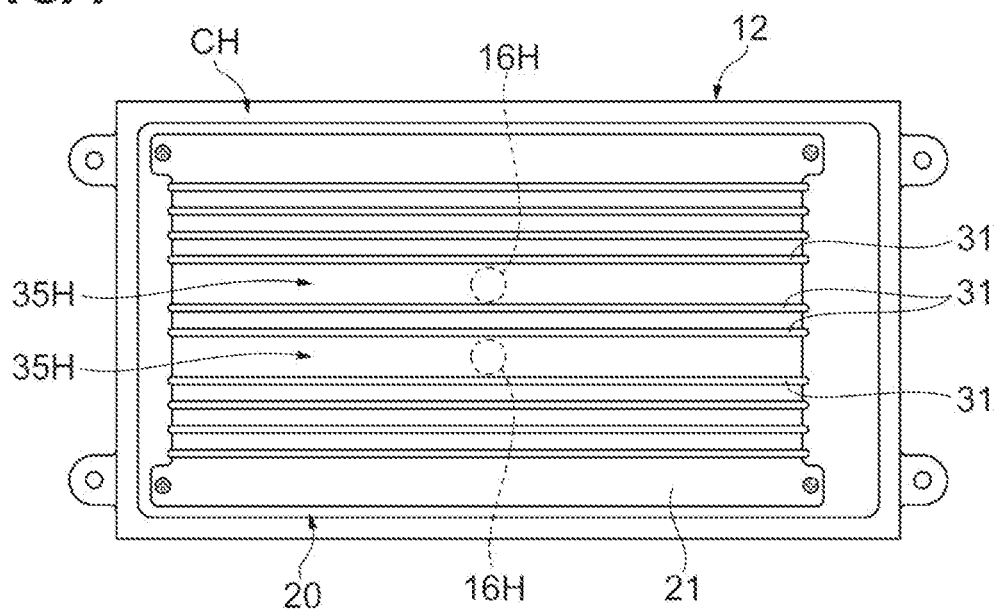
FIG. 15A is a plan view illustrating a mode in which two fasteners are arranged in a winding axis direction.

As illustrated in FIG. 15A, two (a plurality of) fasteners 16H may be arranged along the winding axis direction. In this case, for example, two enlarged portions 35H, in which a gap between parallel surface-side extending portions 31 is widened, are provided in a coil portion CH. The fasteners 16H are provided in the respective enlarged portions 35H. In this case, the fasteners 16H and 16H may be provided in point symmetry about the intersection point of the first diagonal lines L1 and L1, that is, the central point of the bobbin 20 (see FIG. 5). In this way, loads applied to both the fasteners 16H and 16H may be easily balanced, and thus strength of the protective cover may be easily increased.

Figure 15B:
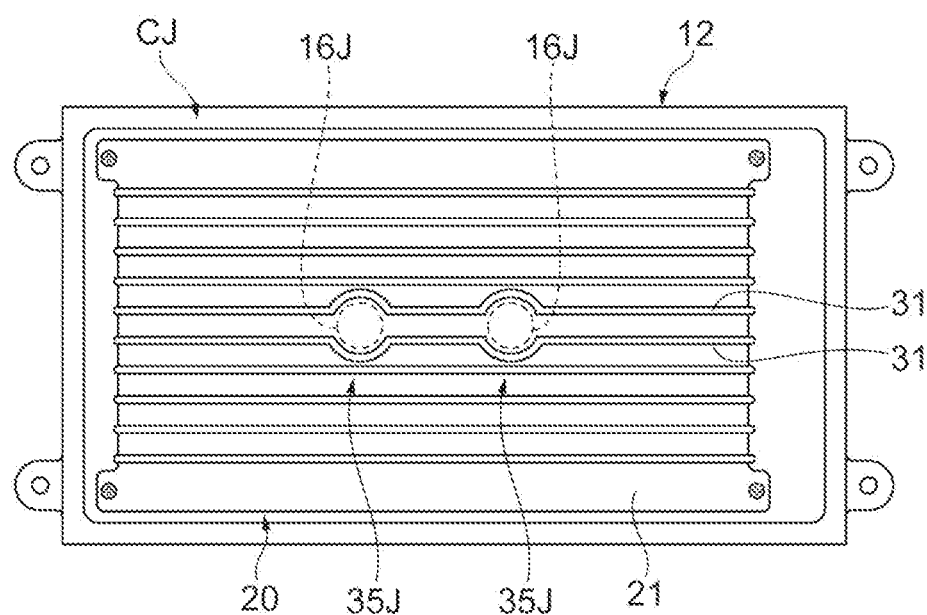
FIG. 15B is a plan view illustrating a mode in which two fasteners are arranged in a wound wire direction.

As illustrated in FIG. 15B, two (a plurality of) fasteners 16J may be arranged along the wound wire direction. In this case, for example, two enlarged portions 35J that circle around the fasteners 16J are provided in a coil portion CJ by bending middle portions of linear-shaped surface-side extending portions 31 in arcs. The fasteners 16J are provided in the respective enlarged portions 35J. In this case, the fasteners 16J and 16J are provided in point symmetry about the intersection point of the first diagonal lines L1 and L1, that is, the central point of the bobbin 20 (see FIG. 5). In addition, if only a position of the second extending portion 31b among the surface-side extending portions 31 is shifted to one side in the winding axis direction as in FIG. 5, the plurality of fasteners 16J may be provided even when a plurality of enlarged portions 35 is not provided unlike the mode of FIG. 15A. When the number of enlarged portions 35 is suppressed, it is possible to suppress a magnetic flux leakage from between pitches due to the enlarged portions 35.

If a plurality of fasteners is provided as described above, sizes of the fasteners may be determined such that a surface area of a surface through which magnetic fluxes of the fasteners pass is the same as a surface area obtained when one fastener 16 is provided. When a surface area of a surface through which magnetic fluxes pass is prevented from increasing, a demerit due to a plurality of fasteners is excluded.

In the above embodiment, a description has been given on a case in which the groove portion 21b and the groove portion 22b are formed on the first winding plate 21 and the second winding plate 22. However, the present invention is not limited to this case. The conductive wire 30 may extend on a surface of a flat winding plate without forming a groove portion on the winding plate.

The present invention is not limited to a case in which the distal end portion 17c of the fastener 16 does not penetrate through the base 12, and the distal end portion 17c may penetrate through the base 12. For example, the distal end portion 17c penetrating through the base 12 is screwed to the vehicle body, and the coil device 5 is more strongly installed in the vehicle body.

In the above embodiment, a description has been given on a case in which an enlarged portion is provided only on the protective cover 11 side or both the protective cover 11 side and the base 12 side. However, the present invention is not limited to this case. For example, the enlarged portion may be provided only on the base 12 side.

The present invention is not limited to a case in which the bobbin 20 is disposed on the base 12 such that the first central region A1 and the second central region A2 do not fully overlap each other (see FIG. 5). For example, the bobbin 20 may be disposed on the base 12 such that a center of the bobbin 20 overlaps a center of the base 12.

In the above embodiment, a description has been given on a case in which a magnetic member is the ferrite plate 23. However, the magnetic member is not restricted to the ferrite plate 23. The magnetic member may be made of another magnetic material (e.g., a silicon steel plate, an amorphous magnetic alloy, and a magnet). In particular, the magnetic member may be made of a soft magnetic material (e.g., ferrite, a silicon steel plate, and an amorphous magnetic alloy) in terms of improving power efficiency. In addition, a component disposed inside the bobbin 20 is not restricted to the magnetic member, and may correspond to a reinforcing material that fills a portion or a whole of a cavity inside the bobbin 20 to ensure strength of the coil portion C. Further, the present invention is not limited to a case in which the magnetic member or the reinforcing material is disposed inside the bobbin 20. The coil portion C may be an air-core coil in which the inside of the bobbin 20 remains as a cavity.

The above embodiment gives an example in which the litz wire is used as the conductive wire 30. However, the present invention is not limited thereto. A conductive wire other than the litz wire may be used as long as the conductive wire functions as a coil device for wireless power transfer. For example, a type, a figure, a form, a material, a configuration, a shape, and a dimension of the conductive wire 30 are arbitrarily selected.

In the above embodiment, a description has been given on a case in which the present disclosure is applied to the coil device 5. However, the present invention is not limited thereto. The present disclosure may be applied to the power transmission coil device 4. In addition, in the above embodiment, a description has been given on a case in which the coil device of the present disclosure is applied to the wireless power transfer system. However, a system to which the coil device is applied is not restricted to the wireless power transfer system. For example, the coil device of the present disclosure may be applied to an induction heating system or an eddy current flaw detection system.

In the above embodiment (in particular, the mode of FIG. 4), a description has been given on a case in which the fastener 16 includes the first screw member 17 and the second screw member 18 as a detailed description of the fastener 16. However, the present invention is not limited thereto. For example, a cylindrical member having the same flange portion as the flange portion 17a may be employed in place of the first screw member 17. In this case, the shaft portion 18b of the second screw member 18 has a shape extended to an extent to penetrate through the cylindrical member, and the distal end portion 18c is screwed to the base 12 rather than the shaft portion 17b of the first screw member 17.

INDUSTRIAL APPLICABILITY

According to some embodiments of the present disclosure, strength of a housing may be increased in a coil device of solenoid type.

The invention claimed is:
1. A coil device of solenoid type comprising:
a coil portion having a bobbin, and a conductive wire wound around the bobbin and a magnetic member disposed inside the bobbin;

a housing for accommodating the coil portion; and
at least one fastener for fastening the bobbin and the housing,
wherein the conductive wire includes a plurality of extending portions extending along a wound wire direction, which intersects with a winding axis direction, on the bobbin,
the coil portion includes an enlarged portion in which a second gap between a first extending portion and a second extending portion adjacent to each other in the winding axis direction is wider than a first gap between another two adjacent first extending portions of the plurality extending portions in the winding axis direction,
at least one fastener is provided in the enlarged portion, and penetrates through the magnetic member,
wherein the housing includes a first housing member facing a first surface of the coil portion having a flat plate shape, and a second housing member fixed to the first housing member to face a second surface on an opposite side from the first surface,
wherein the bobbin includes a first winding plate disposed between the first housing member and the magnetic member, and a second winding plate disposed between the second housing member and the magnetic member, and
the at least one fastener fastens the first winding plate and the second winding plate.

2. The coil device according to claim 1,
wherein a hole portion is provided in the magnetic member,
the first winding plate has a protrusion protruding to an inside of the hole portion, and
the at least one fastener includes
a flange portion contacting the protrusion of the first winding plate from a side of the first housing member,
a shaft portion formed on a distal end side of the flange portion to penetrate through the first winding plate, the magnetic member, and the second winding plate, and
a distal end portion formed on a distal end side of the shaft portion and screwed to the second housing member.

3. The coil device according to claim 2, wherein the at least one fastener includes a first screw member in which the flange portion, the shaft portion, and the distal end portion are integrally formed, and a second screw member penetrating through the first housing member to be screwed to the shaft portion.

4. The coil device according to claim 1, wherein the at least one fastener penetrates through the housing.

5. The coil device according to claim 1,
wherein the at least one fastener includes
a first combined member integrally provided in the first housing member to protrude toward the second housing member, and
a second combined member integrally provided in the second housing member to protrude toward the first housing member, and
at least one of the first combined member and the second combined member is disposed inside the coil portion, and the first combined member and the second combined member are combined together.

6. The coil device according to claim 1,
wherein the conductive wire of the coil portion includes
a first extending portion and a second extending portion extending to both sides of the at least one fastener in the winding axis direction to form the enlarged portion,
a distance between the at least one fastener and the second extending portion is smaller than a distance between the fastener and the first extending portion, and
a gap between the second extending portion and a third extending portion adjacent to the second extending portion in the winding axis direction is narrower than a gap between the other extending portions.

7. The coil device according to claim 1, wherein the at least one fastener is provided in a central region of the bobbin in the wound wire direction and the winding axis direction.

8. The coil device according to claim 1, wherein the at least one fastener is provided in a central region of the housing in the wound wire direction and the winding axis direction.

9. The coil device according to claim 1, wherein the at least one fastener is provided in a region in which a decrease in power efficiency due to provision of the fastener is less than or equal to 0.1%.

10. The coil device according to claim 1, wherein the at least one fastener is provided in a region in which a magnetic flux density in the coil portion is lower than a magnetic flux density in another region.

11. The coil device according to claim 1, wherein the at least one fastener comprises a plurality of fasteners, and the plurality of fasteners are arranged along the winding axis direction.

12. The coil device according to claim 1, wherein the at least one fastener comprises a plurality of fasteners, and the plurality of fasteners are arranged along the wound wire direction.

* * * * *